United States Patent [19]

Kawakami

[11] Patent Number: 5,757,489
[45] Date of Patent: May 26, 1998

[54] INTERFEROMETRIC APPARATUS FOR MEASURING A PHYSICAL VALUE

[75] Inventor: Jun Kawakami, Yamato, Japan

[73] Assignee: Nikon Corporation, Tokyo, Japan

[21] Appl. No.: 703,624

[22] Filed: Aug. 23, 1996

[30] Foreign Application Priority Data

| Aug. 24, 1995 | [JP] | Japan | 7-215579 |
| Aug. 25, 1995 | [JP] | Japan | 7-217860 |

[51] Int. Cl.[6] .................................................. G01B 9/02
[52] U.S. Cl. ................................. 356/349; 356/358
[58] Field of Search ................................ 356/358, 349

[56] References Cited

U.S. PATENT DOCUMENTS

| 4,948,254 | 8/1990 | Ishida | 356/358 |
| 5,153,669 | 10/1992 | DeGroot | 356/349 |
| 5,404,222 | 4/1995 | Lis | 356/349 |

FOREIGN PATENT DOCUMENTS

95/19541  7/1995  WIPO.

*Primary Examiner*—Frank G. Font
*Assistant Examiner*—Amanda Merlino
*Attorney, Agent, or Firm*—Foley & Lardner

[57] ABSTRACT

The displacement of the stage of an exposure apparatus can be measured by obtaining the phase difference between a light beam reflected by a stationary mirror and a light beam reflected by a movable mirror placed on the stage. This apparatus calculates the position data of the stage at second time by using the position data of the stage at first time which is measured by using first and second frequencies, the position data of the stage at the first time which is measured by using a third frequency, and the position data of the stage at the second time which is measured by using the third frequency.

13 Claims, 21 Drawing Sheets

1

INTERFEROMETRIC APPARATUS FOR MEASURING A PHYSICAL VALUE

BACKGROUND OF THE INVENTION

1. Field of the Invention

The present invention relates to an optical interference measuring apparatus for measuring the displacement of an object with a high precision.

2. Related Background Art

Recently, interference measurement apparatuses have been used to measure the lengths, displacements, densities, and the like of objects. Such interference measurement apparatuses are disclosed in U.S. Pat. Nos. 4,948,254 and 5,404,222.

When interferometry based on light waves is performed in air or another gas, the measurement accuracy is degraded by local refractive index variations caused by changes in environmental conditions including temperatures, atmospheric pressures, and the like.

SUMMARY OF THE INVENTION

The position (displacement) of the stage of an exposure apparatus can be measured by obtaining the phase difference between a light beam reflected by a stationary mirror and a light beam reflected by a movable mirror placed on the stage. Since the phase of each light beam changes as the refractive index of air in the propagation path of each light beam changes, the position is measured with an error. For this reason, the position of the stage is detected by using a light beam having another frequency. Since these measured position data are equally influenced by a change in environmental conditions, it is expected that the true position can be measured by calibrating one measured position data with the other measured position data. However, the stage moves. If, therefore, two position data do not indicate stage positions at given time, the calibrated position data does not coincide with the true position.

The position data of the stage at second time is calculated by using the position data of the stage at first time which is measured by using first and second frequencies, the position data of the stage at the first time which is measured by using a third frequency, and the position data of the stage at the second time which is measured by using the third frequency, thereby measuring the stage position more accurately.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
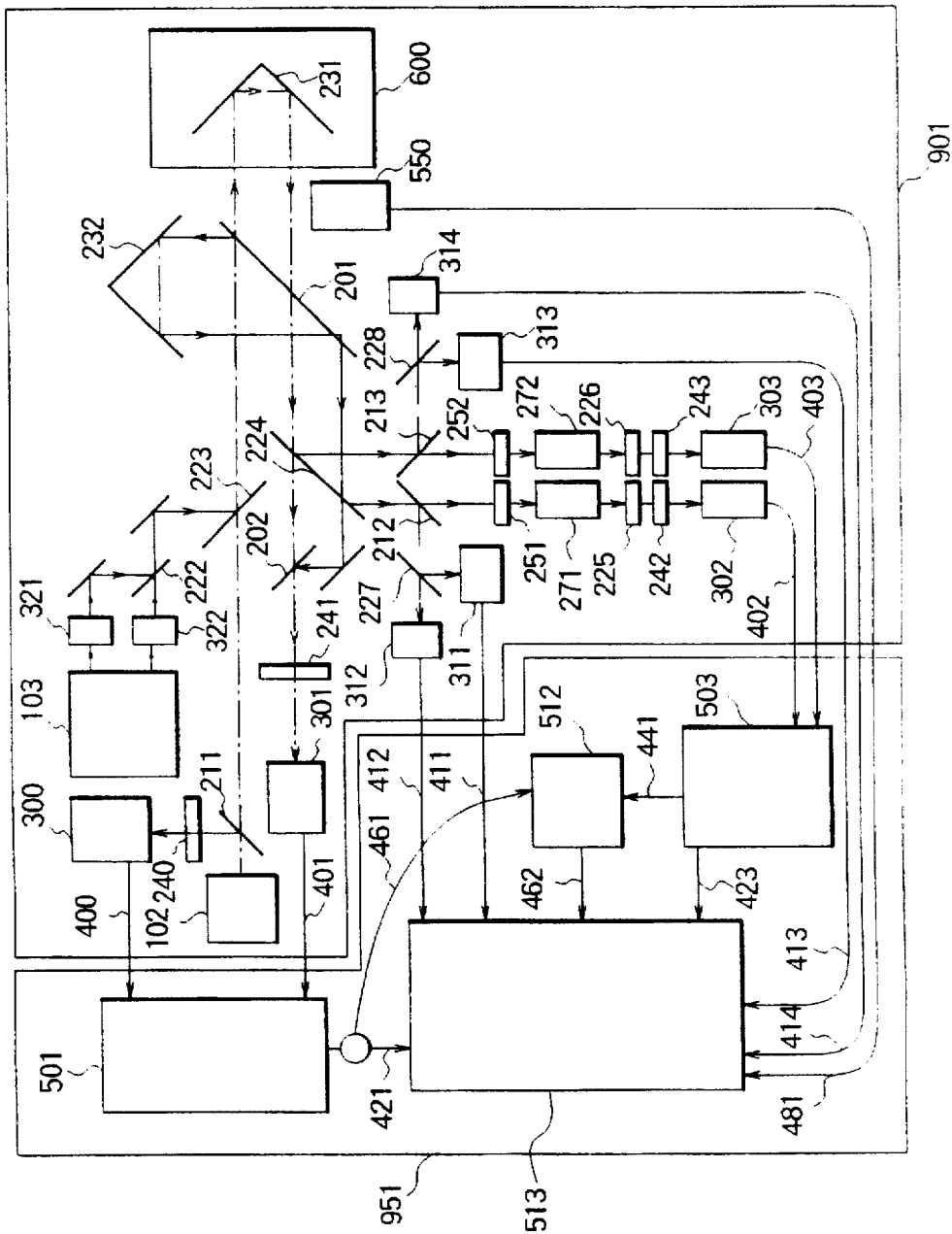
FIG. 1 is a block diagram showing the schematic arrangement of the first embodiment of the present invention.

An optical interference measuring apparatus which has a means for correcting the influence of variations in refractive index and is to be compared with the present invention will be described with reference to FIG. 6. A light beam having a frequency f1 which is emitted from a light source 101 to measure a refractive index variation is incident on a wavelength conversion element 270, by which part of the light beam having frequency f1 is converted into a second harmonic wave having a frequency f2 (=2 f1). The light beams having the frequencies f1 and f2 and emerging from the wavelength conversion element 270 are incident on a wavelength selection element (dichroic mirror) 221. The light beam having the frequency f2 is transmitted through the wavelength selection element 221, whereas the light beam having the frequency f1 is reflected by the wavelength selection element 221.

The light beam having the frequency f1 and reflected by the wavelength selection element 221 is converted by a frequency shifter 321 into a light beam (f1'=f1+Δf1) having a frequency f1' slightly shifted from the frequency f1. Note that the frequency shifter 321 is an acousto-optic modulator or the like.

The light beam having the frequency f2 and transmitted through the wavelength selection element 221 is converted into a light beam (f2'=f2+Δf2) having a frequency f2' slightly shifted from the frequency f2. Note that the frequency shifter 322 is an acousto-optic modulator or the like.

The light beams having the frequencies f1' and f2' are coupled again on the same optical path by a wavelength selection element 222. The resultant light is reflected by a wavelength selection element 223 to propagate in the same optical path as that of light beams having frequencies f3 and f3' and emitted from a displacement-measurement light source 102. Note that the wavelength selection element 223 transmits only light components having frequencies near the frequency f3 but reflects light components having other frequencies.

The light beams having the frequencies f1' and f2' and reflected by the wavelength selection element 223 are incident on a polarization beam splitter 201 to be split into two light beams. In this case, a light beam reflected by the polarization beam splitter 201 and propagating toward a stationary mirror 232 will be referred to as a reference light beam, and a light beam transmitted through the polarization beam splitter 201 and propagating toward a movable mirror 231 will be referred to as a measurement light beam. Note that the polarization azimuths of the reference and measurement light beams are orthogonal to each other, and each light beam contains light components having the frequencies f1' and f2'. The polarization beam splitter 201 is inclined at 45° with respect to the polarization azimuth of the light beams having the frequencies f1' and f2' which are incident from the light source side.

The reference light beam reflected by the polarization beam splitter 201 is reflected by the stationary mirror 232 constituted by a corner cube prism, and returns to the polarization beam splitter 201. Meanwhile, the measurement light beam transmitted through the polarization beam splitter 201 is also reflected by the movable mirror 231 constituted by a corner cube prism, and returns to the polarization beam splitter 201. At this time, the stationary mirror 232 or the movable mirror 231 is disposed to be shifted in a direction perpendicular to the optical axis such that the reference and measurement light beams which have returned to the polarization beam splitter 201 do not overlap on the same axis.

The light beams having the frequencies f1' and f2' which have emerged from the polarization beam splitter 201 and propagated in the reference optical path, and the light beams having the frequencies f1' and f2' which have emerged from the polarization beam splitter 201 and propagated in the measurement optical path are reflected by a wavelength selection element 224. The wavelength selection element 224 transmits only light components having frequencies near the frequency f3 but reflects light components having other frequencies.

The light beams having the frequencies f1' and f2' which have been reflected by the wavelength selection element 224 and propagated in the reference optical path, and the light beams having the frequencies f1' and f2' which have been reflected by the wavelength selection element 224 and propagated in the measurement optical path are incident on wavelength conversion elements 271 and 272, respectively. Each of the wavelength conversion elements 271 and 272 wavelength-converts the light beam having the frequency f1', of the light beams having the frequencies f1' and f2', which is lower than the frequency f2' to produce a light beam having a frequency f2" (=2f1'). At this time, the phase of the light beam having the frequency f2" coincides with the phase of the light beam having the frequency f1' which is incident on the wavelength conversion element.

The light beams having the frequency f2", which are produced upon wavelength conversion in the wavelength conversion elements 271 and 272, interfere with the light beams having the frequency f2', which are processed upon wavelength conversion in the wavelength conversion element 270. The interference light beams are received by photoelectric conversion elements 302 and 303. These interference light beams have information of the optical path length difference between the light beams having the frequencies f1' and f2' which have propagated in the same optical path.

The outputs from the photoelectric conversion elements 302 and 303 are input to a phase mater 502 as an interference signal 402 based on the light having passed through the reference optical path and an interference signal 403 based on the light having passed through the measurement optical path.

The phase mater 502 obtains a change {ΔD(f2')-AD(f1')} in the phase difference between the interference signal 402 based on the light having passed through the reference optical path and the interference signal 403 based on the light having passed through the measurement optical path, and outputs a phase difference variation signal 422 to a processing device 511.

Meanwhile, orthogonal two-frequency light beams (f3, f3'=f3+Δf3) which are emitted from the displacement-measurement light source 102, slightly differ in frequency, and have orthogonal polarizing directions are transmitted through the wavelength selection element 223 and propagate in the same optical path as that of the light beams having the frequencies f1' and f2'.

The two-frequency light beams transmitted through the wavelength selection element 223 are incident on the polarization beam splitter 201. In this case, the polarization beam splitter 201 is positioned to reflect a light beam having the same polarization azimuth as that of the light beam having the frequency f3' and transmit a light beam having the same polarization azimuth as that of the light beam having the frequency f3. Of the two-frequency light beams incident on the polarization beam splitter 201, therefore, the light beam having the frequency f3' propagates as a reference light beam toward the stationary mirror 232, and the light beam having the frequency f3 propagates as a measurement light beam toward the movable mirror 231. Thereafter, these light beams pass through the polarization beam splitter 201 and are incident on the wavelength selection element 224, as in the case of the reference and measurement light beams having the frequencies f1' and f2'. As described above, since the wavelength selection element 224 transmits light components having frequencies near the frequency f3, the light beams having the frequencies f3 and f3' are transmitted through the wavelength selection element 224 to be separated from the light beams having the frequencies f1' and f2'.

The light beam having the frequency f3 and transmitted through the wavelength selection element 224 and the light beam having the frequency f3' and reflected by a mirror 227 are coupled on the same optical path by a polarization beam splitter 202.

The two-frequency light beams emerging from the polarization beam splitter 202 are transmitted through a polarizer 241 to interfere with each other. For example, the polarizer 241 has a polarizing plate inclined at 45° with respect to the polarization azimuth of the two-frequency light beams.

This interference light is received by a photoelectric conversion element 301 to be input as a measurement signal 401 (frequency Δf3) to a phase mater 501.

The two-frequency light beams emerging from the displacement-measurement light source 102 are partly reflected by a beam splitter 211, transmitted through a polarizer 240, and received by a photoelectric conversion element 300 to be input as a reference signal 400 (frequency Δf3) to the phase mater 501. Note that the polarizer 240 serves to cause two-frequency light beams to interfere with each other in the same manner as the polarizer 241.

The phase mater 501 obtains a displacement ΔD(f3) of the movable mirror 231 by measuring a change in the phase of the measurement signal 401 with respect to the reference signal 400, and outputs the resultant signal as a displacement signal 421 to the processing device 511.

The processing device 511 receives the signals 421 and 422 respectively output from the phase meters 501 and 502, and performs an arithmetic operation for correcting a refractive index variation by using the following equations, thereby outputting a true displacement ΔD to the movable mirror 231.

$$\Delta D = \Delta D(f3) - A\{\Delta D(f2') - \Delta D(f1')\} \quad (1)$$

for A is given by $$A = K(f3)/\{K(f2') - K(f1')\} \quad (2)$$

In addition, ΔD(f3), ΔD(f1'), and ΔD(f2') are given by $$\Delta(f3) = \{1 + N \cdot K(f3)\} \cdot \Delta D \quad (3)$$

$$\Delta D(f1') = \{1 + N \cdot K(f1')\} \cdot \Delta D \quad (4)$$

$$\Delta D(f2') = \{1 + N \cdot K(f2')\} \Delta D \quad (5)$$

where N is the density of a medium, K(f) is the function determined by only a frequency f of light provided that the composition of the medium remains the same.

Figure 6:
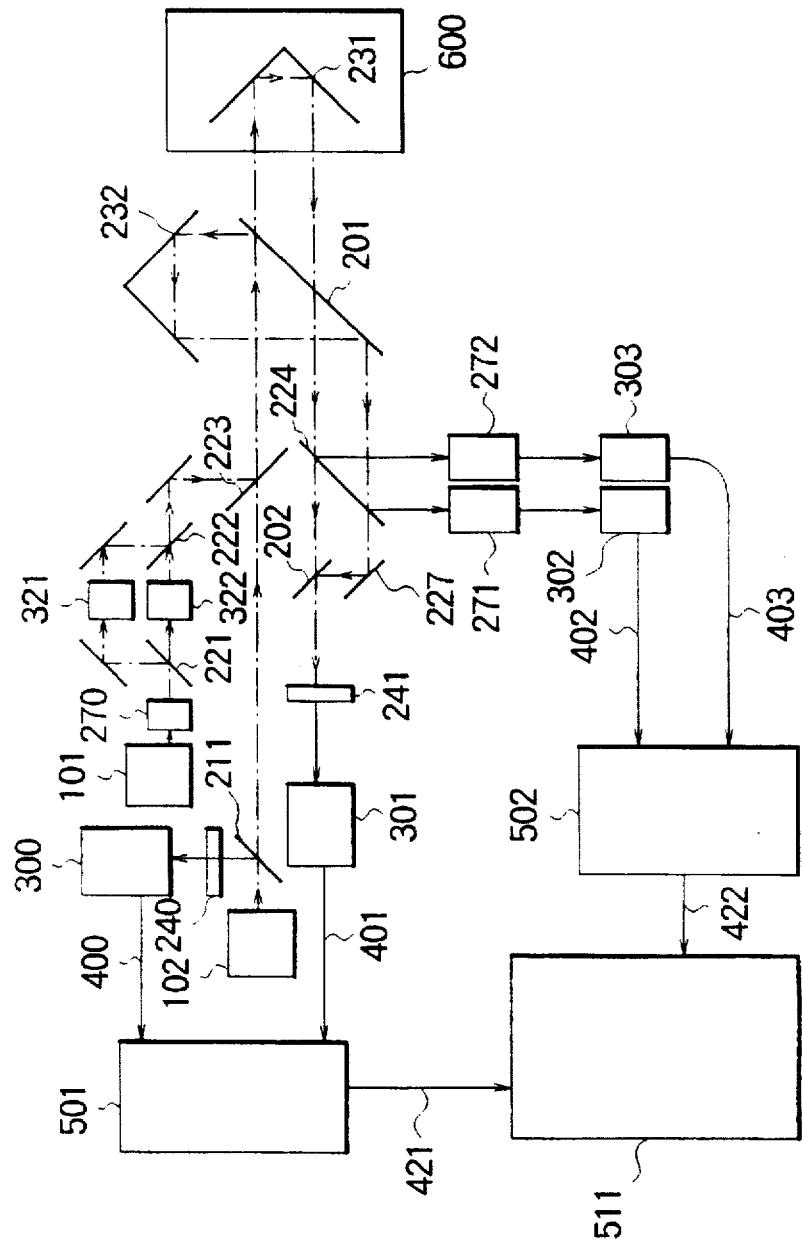
FIG. 6 is a block diagram showing the schematic arrangement of an optical interference measuring apparatus.

The apparatus in FIG. 6, however, uses equation (1) to obtain the true displacement of the object to be measured. For this reason, a large error may be caused depending on the relationship between factors including a delay time with which ΔD(f3) in equation (1) is calculated, an averaging time (or a time constant), a detection value output update period, and a calculation speed, factors including a delay time with which {ΔD(f2')-ΔD(f1')} is detected, an averaging time (or a time constant), a detection value output update period, and a calculation speed, and the moving speed of the object to be measured. Especially when the moving speed of the object is high, the operation result is greatly influenced, and the error amount is greatly influenced by the differences between the averaging times (or the time constants) and the detection value output update periods. In a device for detecting ΔD(f3) in equation (1), the averaging time (or the time constant) can be regarded as 0, and a detection value output update period of 0.1 μs is attained. A device for detecting {ΔD(f2')-ΔD(f1')} in equation (1) demands a high resolution. For this reason, as this device, only a device having an averaging time (or a time constant) of several tens μs to several tens ms or a detection value output update period of 1 μs to several tens ms is available.

Figure 7:
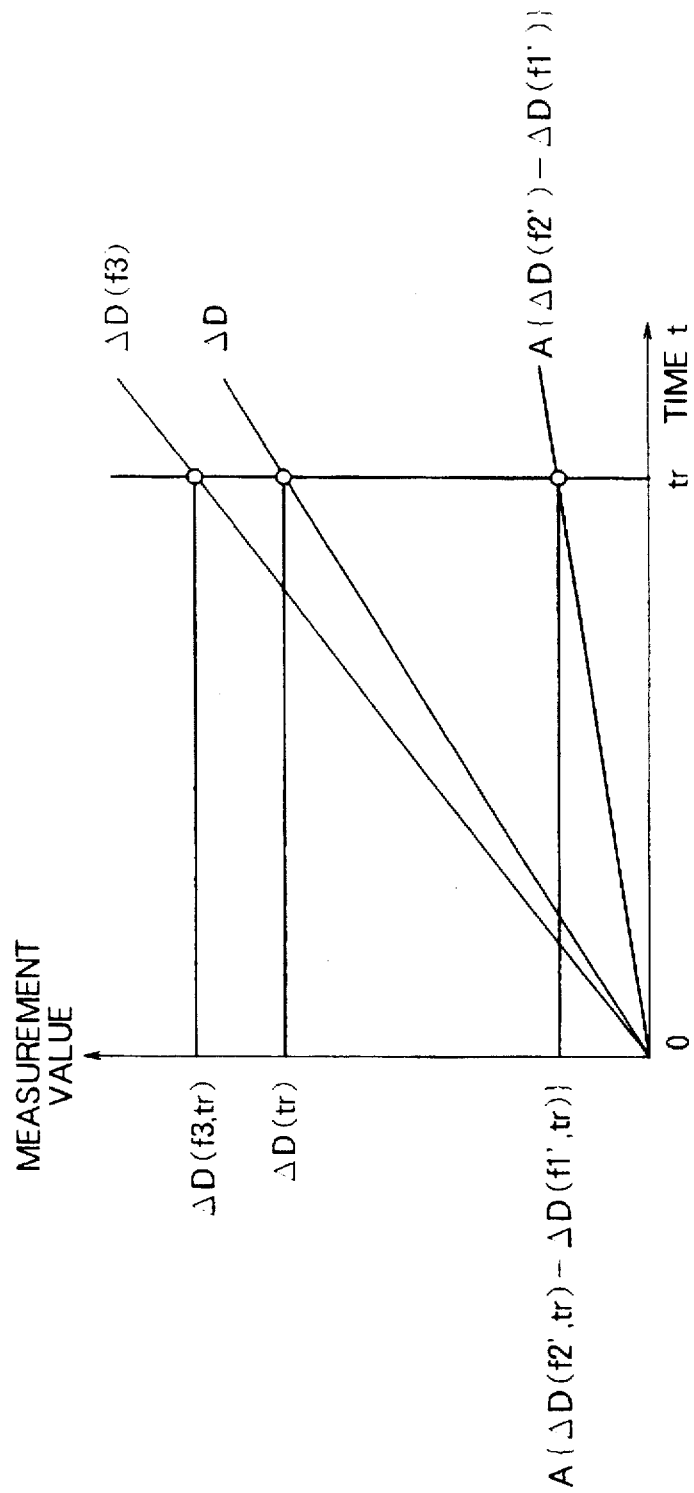
FIG. 7 is a graph showing the relationship between a true displacement, a displacement-measurement value, and refractive index variation measurement value.

FIG. 7 shows the relationship between ΔD, ΔD(f3), and A{ΔD(f2')-ΔD(f1')}.

A true displacement ΔD(tr) at time tr can be calculated without any error according to equation (1) by using Δ(f3,tr) and A{ΔD(f2',tr)-ΔD(f1',tr)} measured at the same time.

Figure 8:
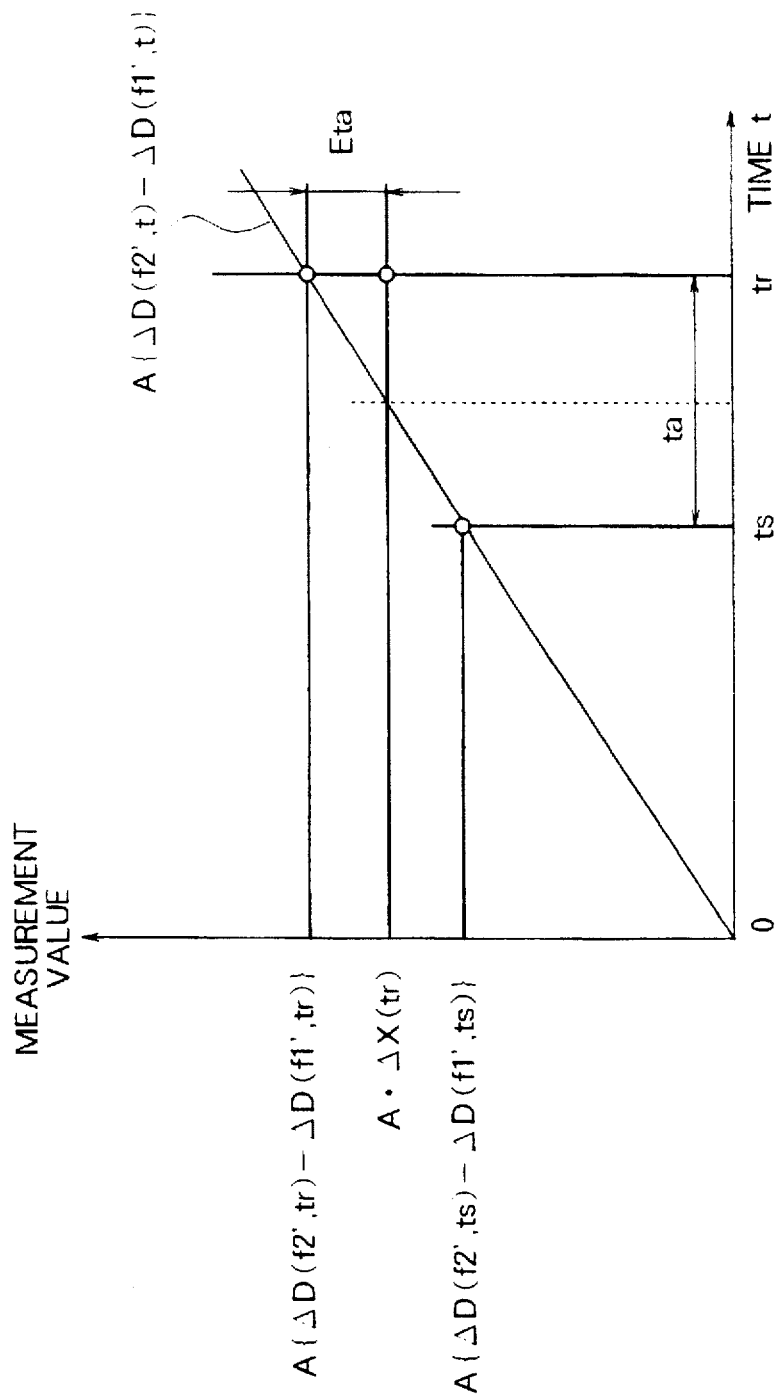
FIG. 8 is a graph showing the influences of averaging times in the optical interference measuring apparatus in FIG. 6.

FIG. 8 shows A{ΔD(f2')-ΔD(f1')} obtained when measurement is performed by using a device having an averaging time ta as a device for detecting {ΔD(f2')-ΔD(f1')}.

The value to be measured at time tr is A{ΔD(f2',tr)-ΔD(f1',tr)}, whereas an actual measurement value A·ΔX(tr) is the average of values measured between time ts and time tr. If, therefore, the measurement value at time tr is used, the operation result includes an error Eta.

The magnitude of this error Eta is given as follows, provided that the density variation (i.e., the refractive index variation) of the medium falls outside the measurement area, and the moving speed of the object is a constant value V.

$$\begin{aligned}
Eta &= A\{\Delta D(f2',tr) - \Delta D(f1',tr)\} - A \cdot \Delta X(tr) \quad (6)\\
&= A\{(1 + N \cdot K(f2'))\Delta D(tr) - (1 + N \cdot K(f1'))\Delta D(tr)\} -\\
&\quad A\{(1 + N \cdot K(f2'))\Delta D(tr - ta/2) -\\
&\quad (1 + N \cdot K(f1'))66D(tr - ta/2)\}\\
&= A\{(1 + N \cdot K(f2')) - (1 + N \cdot K(f1'))\}\Delta D(tr) -\\
&\quad A\{(1 + N \cdot K(f2')) - (1 + N \cdot K(f1'))\}\{66D(tr) - \Delta D(ta/2)\}\\
&= A\{(1 + N \cdot K(f2')) - (1 + N \cdot K(f1'))\}\Delta D(ta/2)\\
&= N \cdot K(f3) \cdot \Delta D(ta/2)\\
&= N \cdot K(f3) \cdot V \cdot ta/2
\end{aligned}$$

Assume that the averaging time ta is 1 ms, the moving speed of the object to be measured is 0.4 m/s, the medium in the measurement area is standard air, and the light having the frequency f3 is an He-Ne laser beam (633 nm). In this case, $$\begin{aligned}
Eta &= N \cdot K(f3) \cdot V \cdot ta/2 \quad (7)\\
&= 2.69 \times 10^{-4} \cdot 0.4 \cdot 0.5 \times 10^{-3}\\
&= 53.8 \times 10^{-3}
\end{aligned}$$

That is, an error of about 54 nm occurs.

Figure 9:
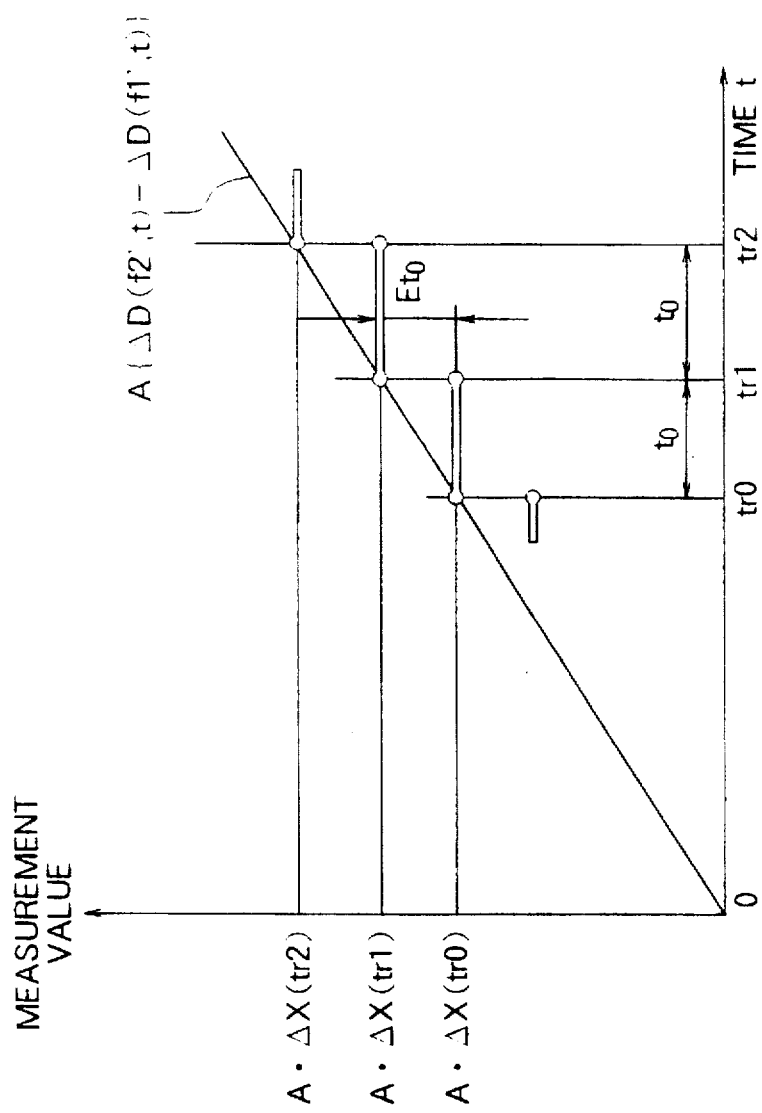
FIG. 9 is a graph showing the influences of detection value output update periods in the optical interference measuring apparatus in FIG. 6.

FIG. 9 shows A{ΔD(f2')-ΔD(f1')} obtained when a device having a detection value output update period to as a device for detecting {ΔD(f2')-ΔD(f1')}. In this case, the averaging time in measurement is 0.

The value to be output in the interval between time tr0 and time tr1 is A{ΔD(f2',t)-ΔD(f1',tl, whereas an actual output value is fixed to A·ΔX(tr0). The operation result includes an error Eto immediately before the output value is updated at time tr1.

The magnitude of this error Eto is given as follows, provided that the density variation (i.e., the refractive index variation) of the medium falls outside the measurement area, and the moving speed of the object is the constant value V.

$$
\begin{aligned}
E_{to} &= A\{\Delta D(f2',tr1) - \Delta D(f1',tr1)\} - A \cdot \Delta X(tr0) \quad (8)\\
&= A\{(1+N \cdot K(f2'))\Delta D(tr1) - (1+N \cdot K(f1'))\Delta D(tr1)\} -\\
&\quad A\{(1+N \cdot K(f2')\Delta D(tr0) - (1+N \cdot K(f1'))\Delta D(tr0)\}\\
&= A((1+N \cdot K(f2')) - (1+N \cdot K(f1'))\}\Delta D(tr1) -\\
&\quad A\{(1+N \cdot K(f2')) - (1+N \cdot K(f1'))\}\Delta D(tr0)\\
&= A\{(1+N \cdot K(f2')) - (1+N \cdot K(f1'))\}\{\Delta D(tr1) - \Delta D(tr0)\}\\
&= N \cdot K(f3) \cdot \Delta D(to)\\
&= N \cdot K(f3) \cdot V \cdot to
\end{aligned}
$$

Assume that the output update period to is 100 μs, the moving speed of the object to be measured is 0.4 m/s, the medium in the measurement area is standard air, and the light having the frequency f3 is an He-Ne laser beam (633 nm). In this case, $$
\begin{aligned}
E_{to} &= N \cdot K(f3) \cdot V \cdot to \quad (9)\\
&= 2.69 \times 10^{-4} \cdot 0.4 \cdot 100 \times 10^{-6}\\
&= 10.8 \times 10^{-9}
\end{aligned}
$$

That is, an error of about 11 nm occurs.

The actual measurement value includes an error caused by the averaging time (or the time constant) and an error caused by the output value update period.

Since the device for detecting $\{\Delta D(f2')-\Delta D(f1')\}$ is inferior in terms of real time measurement to the device for detecting $\Delta D(f3)$, this apparatus cannot take full advantage of the real-time characteristics of the device for detecting $\Delta D(f3)$. In addition, even in a state wherein the medium in the measurement area undergoes no change in density change (i.e., no refractive index variation), an error proportional to the moving speed of the object to be measured occurs.

An apparatus to be described below can correct a displacement-measurement error accompanying a refractive index variation in real time even if a local refractive index variation occurs.

According to the present invention, in order to improve the accuracy, there is provided an optical interference measuring apparatus comprising:

an optical means for using a first light beam having a frequency f1 and a second light beam having a frequency f2 different from the frequency f1 and detecting a difference $\{\Delta D(f2)-\Delta D(f1)\}$ difference between $\Delta D(f2)$ corresponding to the displacement of an object to be measured which is detected by using the second light beam and $\Delta D(f1)$ corresponding to the displacement of the object which is detected by using the first light beam;

an optical means for detecting a displacement $\Delta D(f3)$ of the object by using a third light beam having a frequency f3;

an electric means for detecting the difference $\{\Delta D(f2)-\Delta D(f1)\}$ and outputting a detection result $\Delta X(td)$ of the difference $\{\Delta D(f2)-\Delta D(f1)\}$ at time td;

an electric means for detecting the displacement $\Delta D(f3)$ and outputting a detection result $\Delta D(f3,tr)$ of the displacement $\Delta D(f3)$ at time tr;

an electric means for obtaining $\Delta M(td)$ at time td from continuous j (not less than 1) detection results $\Delta D(f3,t1)$, $\Delta D(f3,t2)$, ..., $\Delta D(f3,tj)$ at time t1, time t2, ..., time tj; and an electric means for obtaining a true displacement $\Delta D(tr)$ of the object at time tr by using the detection results $\Delta D(f3,tr)$, $\Delta X(td)$, and $\Delta M(td)$ and equation (10).

$$\Delta D(tr) = \Delta D(f3,tr)\{1 - A \cdot \Delta X(td)/\Delta M(td)\} \quad (10)$$

for A is given by $$A = K(f3)/\{K(f2) - K(f1)\} \quad (11)$$

where K(f) is the function determined by only a frequency f of a light beam unless the composition of the medium changes.

In the present invention, one or more output values of $\Delta D(f3)$ which are continuous along the time axis are sampled by using a sync signal (e.g., a timing signal from the device for detecting $\{\Delta D(f2)-\Delta D(f1)\}$) corresponding to the type of device for detecting $\{\Delta D(f2)-\Delta D(f1)\}$, and an arithmetic operation (e.g., averaging processing) equivalent to an internal processing method of the device for detecting $\{\Delta D(f2)-\Delta D(f1)\}$ and obtaining an output value is performed by a first processing device with respect to a plurality of sampled values, thereby generating one operation value $\Delta M(tw)$ to be processed simultaneously with one output value $\Delta X(tw)$ from the device for detecting $\{\Delta D(f2)-\Delta D(f1)\}$.

A second processing device calculates and outputs a true displacement $\Delta D'(tn)$ at time tn by using $\Delta X(tw)$, $\Delta M(tw)$, and $\Delta D(f3,tn)$ as an output value of $\Delta D(f3)$ at time tn according to equation (12):

$$\Delta D'(tn) = \Delta D(f3,tn)\{1 - A \cdot \Delta X(tw)/\Delta M(tw)\} \quad (12)$$

for A is given by $$A = K(f3)/\{K(f2) - K(f1)\} \quad (13)$$

where K(f) is the function determined by only the frequency f of a light beam unless the composition of the medium changes.

Figure 10:
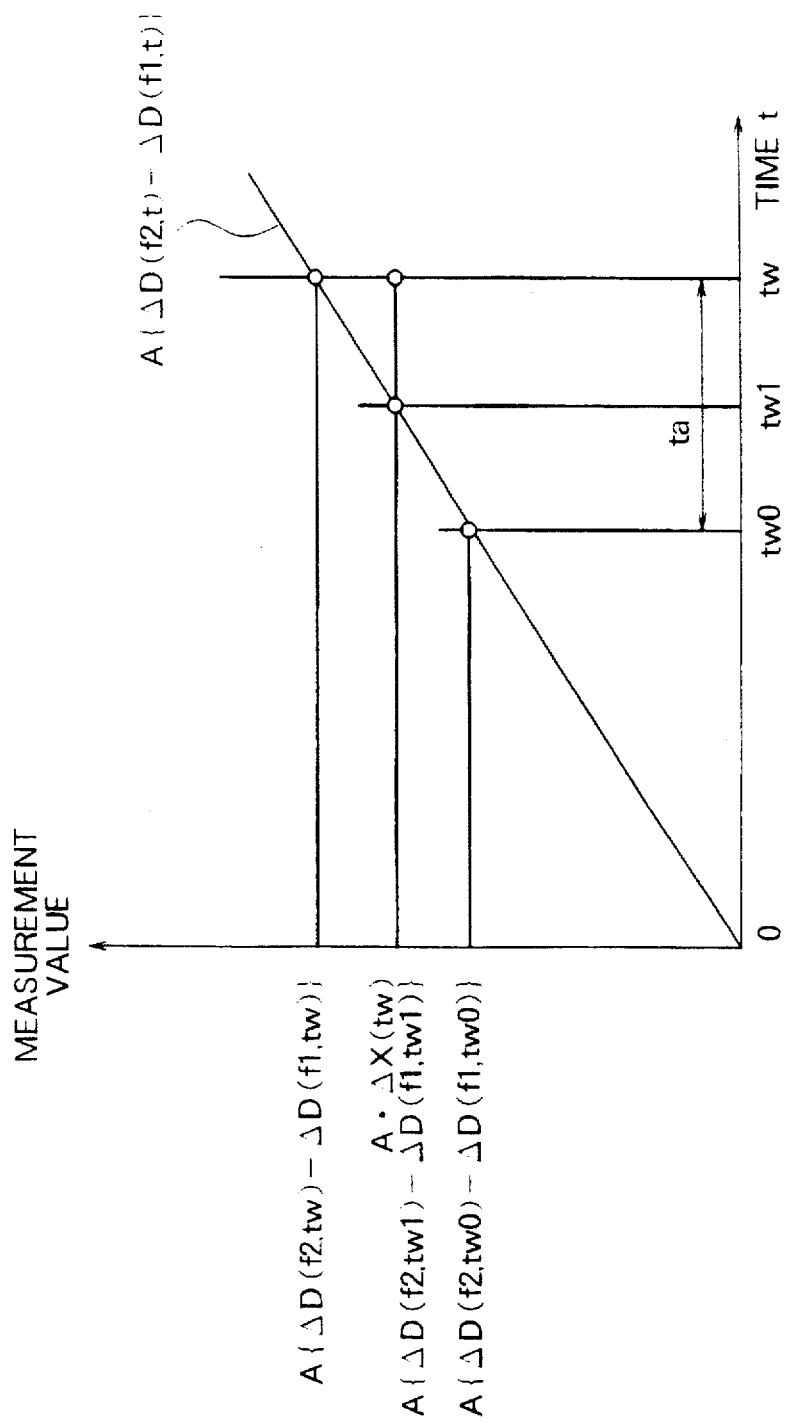
FIG. 10 is a graph showing the influences of averaging times in the present invention.

FIG. 10 shows $A \cdot \{\Delta D(f2)-\Delta D(f1)\}$ obtained when a device having an averaging time ta is used as a device for detecting $\{\Delta D(f2)-\Delta D(f1)\}$.

The value to be output at time tw is $A \cdot \{\Delta D(f2,tw)-\Delta D(f1,tw)\}$, whereas an actual output value is the average of values measured between time tw0 and time tw. The output value $\Delta X(tw)$ at time tw is therefore equal to $\{\Delta D(f2,tw1) - \Delta D(f1,tw1)\}$ at time tw1, and $A \cdot \Delta X(tw)$ can be written as $A \cdot \{\Delta D(f2,tw1) - \Delta D(f1,tw1)\}$.

Figure 11:
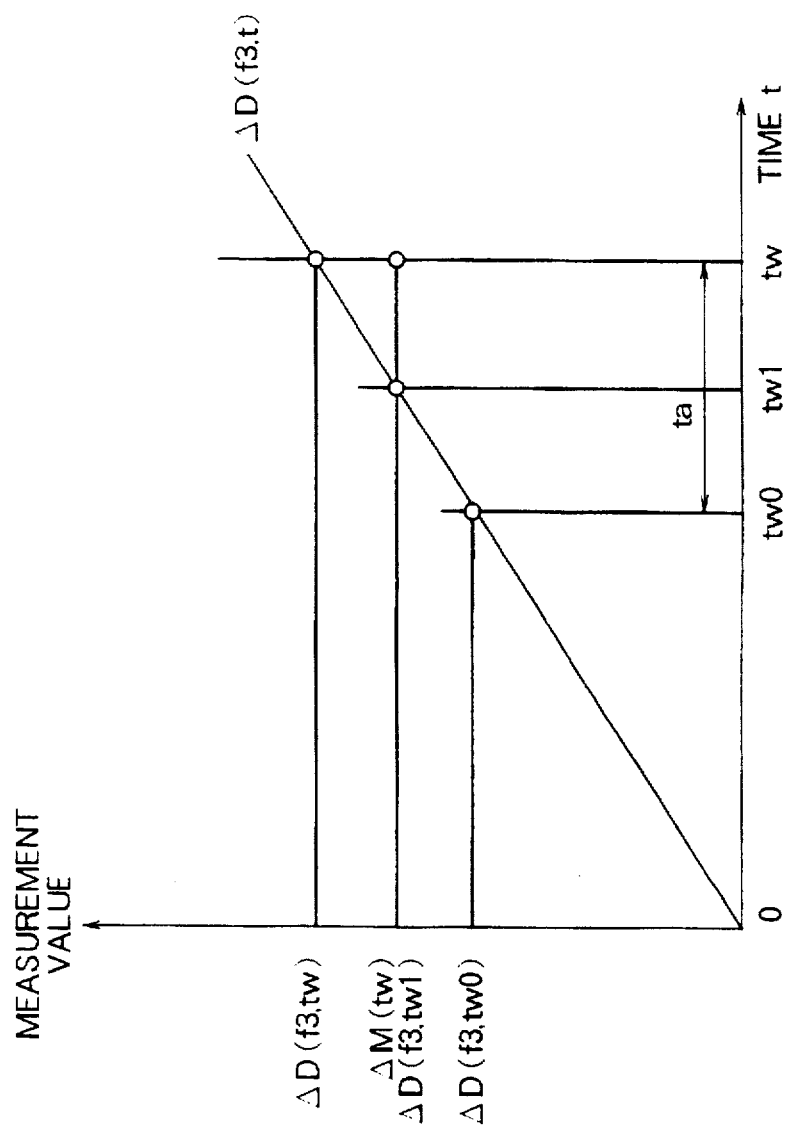
FIG. 11 is a graph showing outputs from a first processing device in the present invention.

FIG. 11 shows the state of $\Delta D(f3)$.

The operation value $\Delta M(tw)$ obtained by the first processing device in the present invention is the average of the values obtained in the interval between time tw0 and time tw, similar to the output value $\Delta X(tw)$. The operation value $\Delta M(tw)$ at time tw is equal to $\Delta D(f3,tw1)$ at time tw1, similar to the output value $\Delta X(tw)$.

Equation (12) is rewritten on the basis of the above description. In this case, $\Delta D(f1,tw1)$, $\Delta D(f2,tw1)$, $\Delta D(f3,tw1)$, and $\Delta D(f3,tn)$ can be rewritten as follows:

$$\Delta D(f1,tw1) = \{1 + N(tw1)\ K(f1)\} \cdot \Delta D(tw1) \quad (14)$$

$$\Delta D(f2,tw1) = \{1 + N(tw1)\ K(f2)\} \cdot \Delta D(tw1) \quad (15)$$

$$\Delta D(f3,tw1) = \{1 + N(tw1)\ K(f3)\} \cdot \Delta D(tw1) \quad (16)$$

$$\Delta D(f3,tn) = \{1 + N(tn) \cdot K(f3)\} \cdot \Delta D(tn) \quad (17)$$

where N(t) is the density of the medium at time t, and $\Delta D(t)$ is the true displacement at time t.

The multiplication $A \cdot \Delta x(tw)$ within the braces in equation (12) is rewritten as follows:

$$A \cdot \Delta X(tw) = A \cdot \{\Delta D(f2,tw1) - \Delta D(f1,tw1)\} \quad (18)$$
$$= A \cdot [\{1 + N(tw1) \cdot K(f2)\} \cdot \Delta D(tw1) -$$
$$\{1 + N(tw1) \cdot K(f1)\} \cdot \Delta D(tw1)]$$
$$= A \cdot [\{K(f2) - K(f1)\} \cdot N(tw1) \cdot \Delta D(tw1)]$$
$$= K(f3)/\{K(f2) - K(f1)\} \cdot$$
$$[\{K(f2) - K(f1)\} \cdot N(tw1) \cdot \Delta D(tw1)]$$
$$= K(f3) \cdot N(tw1) \cdot \Delta D(tw1)$$

Therefore, $\{1 - A \cdot \Delta x(tw)/\Delta M(tw)\}$ in equation (12) is rewritten as follows:

$$\{1 - A \cdot \Delta X(tw)/\Delta M(tw)\} = \{\Delta D(f3,tw1) - A \cdot \Delta X(tw)\}/\Delta D(f3,tw1) \quad (19)$$
$$= [\{1 + N(tw1) \cdot K(f3)\} \cdot D(tw1) - A \cdot$$
$$\Delta X(tw)]/[\{1 + N(tw1) \cdot K(f3)\} \cdot D(tw1)]$$
$$= \Delta D(tw2)/[\{1 + N(tw1) \cdot K(f3)\} \cdot D(tw1)]$$
$$= 1/\{1 + N(tw1) \cdot K(f3)\}$$

Therefore, equation (12) is rewritten as follows according to equation (19):

$$\Delta D'(tn) = \Delta D(f3,tn)\{1 - A \cdot \Delta X(tw)/\Delta M(tw)\} \quad (20)$$
$$= [\{1 + N(tn) \cdot K(f3)\}/\{1 +$$
$$N(tw1) \cdot K(f3)\}] \cdot \Delta D(tn)$$

Equation (20) proves that if the densities of the medium at time tn and time tw1, i.e., N(tn) and N(tw1), are equal, the calculated displacement $\Delta D'(tn)$ has no error, and indicates that equation (12) is effective regardless of the performance (averaging time and output update period) for detecting $\{\Delta D(f2) - \Delta D(f1)\}$ or the moving speed of the object to be measured.

In addition, the density variation (i.e., the refractive index variation) of the medium in the measurement area generally has a variation frequency of several tens Hz or less, and a large variation component has a variation frequency of 10 Hz or less. According to the present invention, therefore, by using a device having an averaging time (or a time constant) and an output update period of at least 10 ms or shorter than 10 ms as a device for detecting $\{\Delta D(f2) - \Delta D(f1)\}$, there is provided an optical interference measuring apparatus which can correct a displacement-measurement error accompanying a refractive index variation in real time even if a local refractive index variation occurs.

FIG. 1 shows an optical interference measuring apparatus which can correct a displacement-measurement error accompanying a variation in the refractive index of a gas in real time according to the present invention.

An optical system section 901 will be described.

Light beams having frequencies f1 and f2 are emitted from a light source 103 for measuring a refractive index variation. In this case, the frequency f2 is twice the frequency f1.

The light beam having the frequency f1 and emitted from the light source 103 is converted by a frequency shifter 321 into a light beam (f1'=f1+Δf1) having a frequency f1' slightly shifted from the frequency f1. Note that the frequency shifter 321 is an acousto-optic modulator or the like.

The light beam having the frequency f2 and emitted from the light source 103 is converted by a frequency shifter 322 into a light beam (f2'=f2 +Δf2) having a frequency f2' slightly shifted from the frequency f2. The frequency shifter 322 is an acousto-optic modulator or the like. Note that Δf2≠2Δf1.

The light beams having the frequencies f1' and f2' are coupled on the same optical path by a wavelength selection element 222. Thereafter, the light beams are reflected by a wavelength selection element 223 to propagate in the same optical path as that of light beams having frequencies f3 and f3' and emitted from a displacement-measurement light source 102. Note that the wavelength selection element 223 transmits light components having frequencies near the frequency f3 and reflects light components having other frequencies.

The light beams having the frequencies f1' and f2' and reflected by the wavelength selection element 223 are incident on a polarization beam splitter 201 to be split into two light beams. In this case, the light beam reflected by the polarization beam splitter 201 and propagating toward a stationary mirror 232, will be referred to as a reference light beam, and the optical path in which the reference light beam propagates will be referred to as a reference optical path. The light beam transmitted through the polarization beam splitter 201 and propagating toward a movable mirror 231 will be referred to as a measurement light beam, and the optical path in which the measurement light beam propagates will be referred to as a measurement optical path. Note that the reference and measurement light beams have orthogonal polarization azimuths, and each light beam contains the light beams having frequencies f1' and f2'. The polarization beam splitter 201 is inclined at 45() with respect to the polarization azimuth of the light beams having the frequencies f1' and f2' which are incident from the light source side.

The reference light beam reflected by the polarization beam splitter 201 is reflected by the stationary mirror 232 constituted by a corner cube prism and returns to the polarization beam splitter 201. The measurement light beam transmitted through the polarization beam splitter 201 is reflected by the movable mirror 231 constituted by a corner cube prism placed on the movable stage 600 and returns to the polarization beam splitter 201. In this case, the stationary mirror 232 or the movable mirror 231 is shifted in a direction perpendicular to the optical axis of each mirror such that the reference and measurement light beams having returned to the polarization beam splitter 201 do not overlap on the same axis.

The light beams having the frequencies f1' and f2' and propagating in the reference optical path and the light beams having the frequencies f1' and f2' and propagating in the measurement optical path, which have emerged from the polarization beam splitter 201, are reflected by a wavelength selection element 224. The wavelength selection element 224 transmits light components having frequencies near the frequency f3 and reflects light components having other frequencies.

The light beams having the frequencies f1' and f2' and propagating in the reference optical path and the light beams having the frequencies f1' and f2' and propagating in the measurement optical path, which have been reflected by the wavelength selection element 224, are respectively incident on beam splitters 212 and 213 to undergo amplitude division. The beam splitters 212 and 213 transmit most part of the light beams having the frequencies f1' and f2' and reflect the remaining light components.

The light beams having the frequencies f1' and f2', which have been transmitted through the beam splitters 212 and 213, are incident on wavelength conversion elements 271 and 272 through λ/2 plates 251 and 252 for light beams having the frequency f1'.

Each of the wavelength conversion elements 271 and 272 performs wavelength conversion of part of the light beam having the frequency f1', of the light beams having the frequencies f1' and f2, which is lower in frequency to generate a light beam having a frequency f2" (=2f1'). In this case, the phase of the light beam having the frequency f2" coincides with the phase of the light beam having the frequency f1' which is incident on the wavelength conversion element. The light beams each having the frequency f2' which are incident on the wavelength conversion elements 271 and 272 are transmitted through the wavelength conversion elements 271 and 272.

The λ/2 plates 251 and 252 for light beams having the frequency f1' are set such that light beams having the frequency f1' are most efficiently converted into light beams having the frequency f2" by the wavelength conversion elements 271 and 272.

Of the light beams having frequencies f1', f2', and f2", which have emerged from the wavelength conversion elements 271 and 272, the light beams having the frequencies f2' and f2" are transmitted through wavelength selection elements 225 and 226.

The light beams having the frequencies f2' and f2", which have been transmitted through the wavelength selection elements 225 and 226, are transmitted through polarizers 242 and 243 to interfere with each other. The resultant interference light beams are received by photoelectric conversion elements 302 and 303. In this case, the polarizers 242 and 243 are placed such that the respective interference signals are maximized. In addition, each interference signal contains the information of the optical path length difference between the light beams having the frequencies f1' and f2' which have propagated in the same optical path.

The outputs from the photoelectric conversion elements 302 and 303 are input to a phase mater 503 as an interference signal 402 based on the light having passed through the reference optical path and an interference signal 403 based on the light beam having passed through the measurement optical path.

The light beams having the frequency f1' and reflected by the beam splitters 212 and 213 are respectively reflected by wavelength selection elements 227 and 228 to be incident on light beam position monitors 311 and 313. The light beams having the frequency f2' and reflected by the beam splitters 212 and 213 are transmitted through the wavelength selection elements 227 and 228 to be incident on light beam position monitors 312 and 314.

Light beam position signals 411, 412, 413, and 414 from the light beam position monitors 311, 312, 313, and 314 are input to the processing device 513.

Each of the light beam position monitors 311, 312, 313, and 314 is constituted by a lens and a position sensor such as a four-division detector placed near the focal point of the lens, and serves to detect a light beam position or light beam position change corresponding to the angle of a light beam or a change in the angle of a light beam incident on a corresponding light beam position monitor.

Meanwhile, orthogonal two-frequency light beams f3 and f3' (f3'=f3+Δf3) having slightly different frequencies and orthogonal polarization azimuths emerge from the displacement-measurement light source 102.

The orthogonal two-frequency light beams are transmitted through the wavelength selection element 223 and propagate in the same optical path as that of the light beams having the frequencies f1' and f2.

The orthogonal two-frequency light beams transmitted through the wavelength selection element 223 are incident on the polarization beam splitter 201. In this case, the polarization beam splitter 201 is placed to reflect a light beam having the same polarization azimuth as that of the light beam having the frequency f3' and transmit a light beam having the same polarization azimuth as that of the light beam having the frequency f3. Of the orthogonal two-frequency light beams incident on the polarization beam splitter 201, therefore, the light beam having the frequency f3' propagates, as a reference light beam, toward the stationary mirror 232, and the light beam having the frequency f3 propagates, as a measurement light beam, toward the movable mirror 231. Thereafter, these light beams pass through the polarization beam splitter 201 and are incident on the wavelength selection element 224 in the same manner as the light beams having the frequencies f1' and f2' and serving as reference and measurement light beams. As described above, since the wavelength selection element 224 transmits light components having frequencies near the frequency f3, the light beams having the frequencies f3 and f3' are transmitted through the wavelength selection element 224 and separated into light beams having the frequencies f1' and f2'.

The light beams having the frequencies f3 and f3', which have been transmitted through the wavelength selection element 224, are coupled on the same optical path by a polarization beam splitter 202.

The orthogonal two-frequency light beams emerging from the polarization beam splitter 202 are transmitted through a polarizer 241 to interfere each other. Note that the polarizer 241 is constituted by a polarizing plate inclined at 450 with respect to the polarization azimuth of an orthogonal two-frequency light beams.

This interference light beam is received by a photoelectric conversion element 301 and input as a measurement signal 401 (frequency Δf3) to a phase mater 501.

The orthogonal two-frequency light beams emerging from the displacement-measurement light source 102 are partly reflected by a beam splitter 211, transmitted through a polarizer 240, and received by a photoelectric conversion element 300. This light component is then input as a reference signal 400 (frequency Δf3) to the phase mater 501. Note that the polarizer 240 serves to cause orthogonal two-frequency light beams to interfere with each other, similar to the polarizer 241.

An environment measurement device 550 is placed near the position between a movable stage 600 and the polarization beam splitter 201 to measure a temperature, an atmospheric pressure, and a partial vapor pressure and input the resultant data as an environment signal 481 to a processing device 513. The environment measurement device 550 may have a function of measuring a carbon dioxide concentration. As the environment measurement device, for example, a commercially available air sensor can be used.

In the optical interference measuring apparatus of this embodiment, in order to measure a refractive index variation more accurately, it is preferable to minimize the refractive index variations of the optical paths of the light beam having the frequency f3 for displacement measurement and the light beams having the frequencies f1 and f2 for refractive index variation measurement, which are obtained by separating each of measurement and reference light beams through the wavelength selection element 224, i.e., the optical path of the light beam having the frequency f3 which extends from the wavelength selection element 224 to the polarization beam splitter 202 and the optical paths of the light beams having the frequencies f1 and f2 which extend from the wavelength selection element 224 to the wavelength conversion elements 271 and 272. For this purpose, for example, the above optical paths are preferably covered with tubes, or an optical system is preferably designed to minimize the intervals between optical elements.

An electric system section 951 will be described.

The phase mater 503 receives the interference signal 402 based on the light beam having the frequency f2" obtained upon conversion of the light beams having the frequencies f1' and f2' and propagating in the reference optical path, and the interference signal 403 based on the light beam having the frequency f2" obtained upon conversion of the light beams having the frequencies f1' and f2' and propagating in the measurement optical path, and measures a phase change Δφ2 of the interference signal 403 with respect to the interference signal 402. This phase change Δφ2 represents the phase change measurement value of {ΔD(f2')−ΔD(f1')} at a given moment.

The actual output from the phase mater 503 is one output phase change Δρ generated from a plurality of instantaneous measurement values (Δφ2) which are continuous along the time axis, and is output as a phase difference variation signal 423 to the processing device 513. In order to obtain a phase difference ΔX between the light beams having the frequencies f2' and f1' which are incident on the movable mirror 231, the processing device 513 performs the following calculation:

$$\Delta X = \Delta \rho / (2\pi) \times (\tfrac{1}{2}) \times (c/f2') \quad (21)$$

where c is the velocity of light.

The phase mater 501 receives the reference and measurement signals 400 and 401 based on the light beam having the frequency f3, and measures a phase change ΔΦ3 of the measurement signal 401 with respect to the reference signal 400, thereby outputting displacement phase signals 421 and 461 to the processing device 513 and a processing device 512. In order to obtain a displacement ΔD(f3) of the movable mirror 231 on the basis of the light beam having the frequency f3, the processing device 513 performs the following calculation:

$$\Delta D(f3) = \Delta \Phi 3 / (2\pi) \times (\tfrac{1}{2}) \times (c/f3) \quad (22)$$

where c is the velocity of light.

The processing device 512 samples and stores the displacement phase signal 461 (ΔΦ3) from the phase mater 501 in response to each timing signal 441 from the phase mater 503. A plurality of stored numerical values which are continuous along the time axis are subjected to an arithmetic operation corresponding to an internal processing method of obtaining one output phase change Δρ from one or more instantaneous phase change measurement values (ΔΦ2) which are continuous along the time axis in the phase mater 503, thereby generating one operation value Δδ(tw) to be processed simultaneously with one output value Δρ(tw) at time tw which is output from the phase mater 503. This operation value is output as a displacement phase averaging signal 462 to the processing device 513.

In order to obtain ΔM(tw) corresponding to a displacement from Δδ(tw), the processing device 513 performs the following calculation:

$$\Delta M(tw) = \Delta \delta(tw) / (2\pi) \times (\tfrac{1}{2}) \times (c/f3) \quad (23)$$

where c is the velocity of light.

The method of generating the operation value Δδ(tw) in the processing device 512 varies depending on the internal processing method in the phase mater 503. However, this operation value is broadly generated in the following manner.

Assume that the phase mater 503 obtains one output value Δρ by using i (one or more) instantaneous measurement values which are continuous along the time axis. In this case, the timing signal 441 is a signal for sampling the displacement phase signal 461 at the same timing as that of the signal for sampling an instantaneous measurement value. In this case, as is apparent, the number of displacement phase signals 461 (ΔΦ3) to be sampled, which are output from the phase mater 501, is i.

If the phase mater 503 is designed to obtain one output value Δρ by using a plurality of analog measurement values in a continuous time range tx, a fixed clock CLK can be used as the timing signal 441. In this case, the number of displacement phase signals 461 (ΔΦ3) to be sampled, which are output from the phase mater 501, can be given by dividing the time range tx by the period of the fixed clock CLK.

Figure 12:
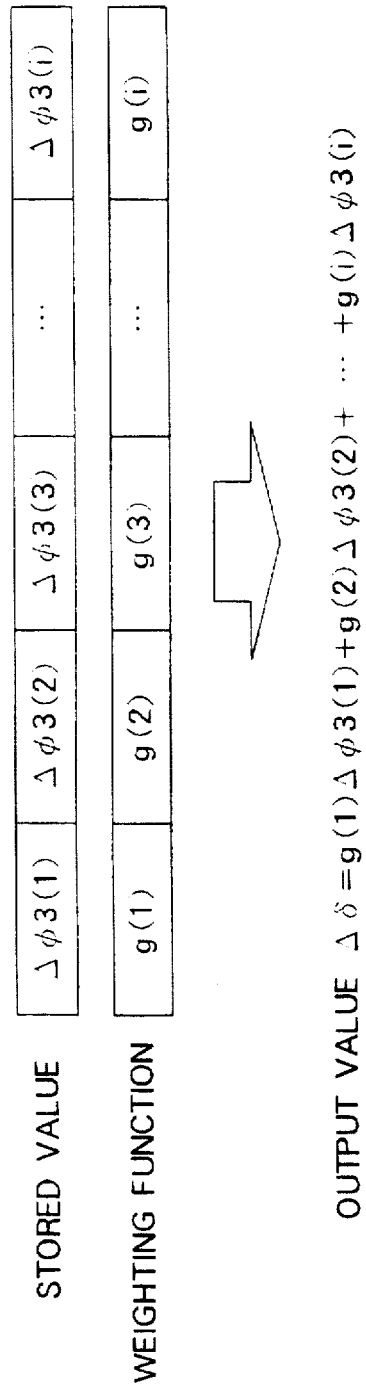
FIG. 12 is a view showing the operation of the first processing device in the present invention.

As shown in FIG. 12, the i stored displacement phase signals ΔΦ3(1), ΔΦ3(2), . . . , ΔΦ3(i) are multiplied by corresponding weighting functions g(1), g(2), . . . , g(i), and the products are added together to obtain one operation value Δδ(tw) to be output. In this case, the weighting functions g(1), g(2), . . ., g(i) are determined by the internal processing method in the phase mater 503. If, for example, simple averaging processing is to be performed, all the weighting functions are set to 1/i. Alternatively, larger weights may be assigned to newer signals of the i signals to be sampled.

The next output value of the operation value Δδ(tw) is obtained as follows. The stored displacement phase signal ΔΦ3(1) is discarded, and ΔΦ3(1), ΔΦ3(2), . . . , ΔΦ3(i−1) are set with the kth value ΔΦ3(k) being set as the (k−1)th value ΔΦ3(k−1). In addition, a displacement phase signal to be newly sampled is defined by ΔΦ3(i), and the same arithmetic operation as described above is performed using weighting functions.

The processing device 513 receives the phase difference variation signal 423 (ΔP(tw)) at time tw, the displacement phase averaging signal 462 (Δδ(tw)), and the displacement phase signal 421 (ΔΦ3(tn)) at time tn, and converts the respective signals into ΔX(tw), ΔM(tw), and ΔD(f3,tn) according to equations (21), (22), and (23). In addition, the processing device 513 calculates a true displacement ΔD(tn) at time tn according to equation (24):

$$\Delta D(tn) = \Delta D(f3,tn)\{1 - A \cdot \Delta X(tw)/\Delta M(tw)\} \quad (24)$$

for A is given by $$A = K(f3)/\{K(f2') - K(f')\} \quad (25)$$

where K(f) is the function determined by only the frequency f of a light beam unless the composition of the medium changes.

The processing device 513 calculates the true displacement ΔD(tn) at time tn by using ΔD(f3,tn) as the output value of ΔD(f3) at time tn according to equation (26):

$$\Delta D(tn) = \Delta D(f3,tn) - A \cdot \Delta X(tw) \quad (26)$$

In this case, the value of A is equal to the one in equation (25).

The processing device 513 has a value B as the initial value of {1−A·ΔX(tw)/ΔM(tw)} in equation (24).

The initial value B is determined by a temperature T, an atmospheric pressure P, a partial vapor pressure F, a carbon dioxide concentration C, and the like which are set environmental conditions in the optical system which are set or measured in advance. More specifically, this initial value is set by using the following equation disclosed in, e.g., B. Edlen "The Refractive Index of Air" Metrologia Vol. 2, No. 2, (1966) P. 71 as follows:

$$B = 1/n(f3) \tag{27}$$

$$n(f3) = n_{TP}(f3) - F(5.7224 - 0.0457\sigma \ (f3)^2) \times 10^{-8}$$

$$n_{TP}(f3) = 1 + (n_s(f3) - 1) \times 0.00138823P/(1 + 0.003671T)$$

$$n_s(f3) - 1 = [1 + 0.540(C - 0.0003)](n_s(f3) - 1)$$

$$(n_s(f3) - 1) \times 10^{-8} = 8342.13 + 2406030/(130 - \sigma \ (f3)^2) + 15997/(38.9 - \sigma \ (f3)^2)$$

$$\sigma(f3) = (f3/c) \times 10^{-6} \tag{28}$$

With this operation, the true displacement $\Delta D(tn)$ at time tn is calculated as follows:

$$\Delta D(tn) = \Delta D(f3,tn) \cdot B \tag{29}$$

The processing device 513 can set a value Bm as the initial value of $\{1-A \cdot \Delta X(tw)/\Delta M(tw)\}$ in equation (24) on the basis of the environment signal 481, input from the environment measurement device 550, which represents a temperature, an atmospheric pressure, a partial vapor pressure, and a carbon dioxide concentration.

The initial value Bm is set by the same method as that for the initial value B. However, actual measurement values obtained by the environment measurement device 550 are used as a temperature T, an atmospheric pressure P, a partial vapor pressure F, and a carbon dioxide concentration C.

With this operation, the true displacement $\Delta D(tn)$ at time tn can be calculated as follows:

$$\Delta D(tn) = \Delta D(f3,tn) \cdot Bm \tag{30}$$

The processing device 513 can set a value Am as the initial value of A in equation (25) on the basis of the environment signal 481, input from the environment measurement device 550, which represents a temperature, an atmospheric pressure, a partial vapor pressure, and a carbon dioxide concentration. More specifically, actual measurement values obtained by the environment measurement device 550 are used as the temperature T, the atmospheric pressure P, the partial vapor pressure F, and the carbon dioxide concentration C, and the initial value Am is determined by using n(f1'), n(f2), and n(f3) obtained by a substitution of f3 into f1'and f2' in equation (28) according to equation (31) below:

$$Am = [n(f3)-1]/[n(f2')-n(f1')] \tag{31}$$

The processing device 513 has a function of obtaining the true displacement $\Delta D(tn)$ at time tn by substituting this initial value Am into equations (24) and (26). Alternatively, the value Am may be determined by using the temperature T, the atmospheric pressure P, the partial vapor pressure F, and the carbon dioxide concentration C which are set or measured in advance, as in the above case wherein the initial value B is determined, without using the environment signal 481 output from the environment measurement device 550.

The processing device 513 can switch and output the true displacements $\Delta D(tn)$ at time tn which are obtained according to equations (24), (26), (29), and (30).

The processing device 513 also obtains an average refractive index $n(f3,tn)$ at time tn with respect to the light beam having the frequency f3 in the optical path by using the obtained true displacement $\Delta D(tn)$ at time tn, the displacement $\Delta D(f3,tn)$, and equation (32):

$$n(f3,tn) = \Delta D(f3,tn)/\Delta D(tn) \tag{32}$$

Note that the refractive index n may be obtained from $n=1(1-A \cdot \Delta X(tw)/\Delta M(tw))$.

In addition, the processing device 513 can correct the angle of a light beam or a measurement error caused by a change in the angle of a light beam by using the light beam position signals 411, 412, 413, and 414 from the light beam position monitors 311, 312, 313, and 314.

Figure 2:
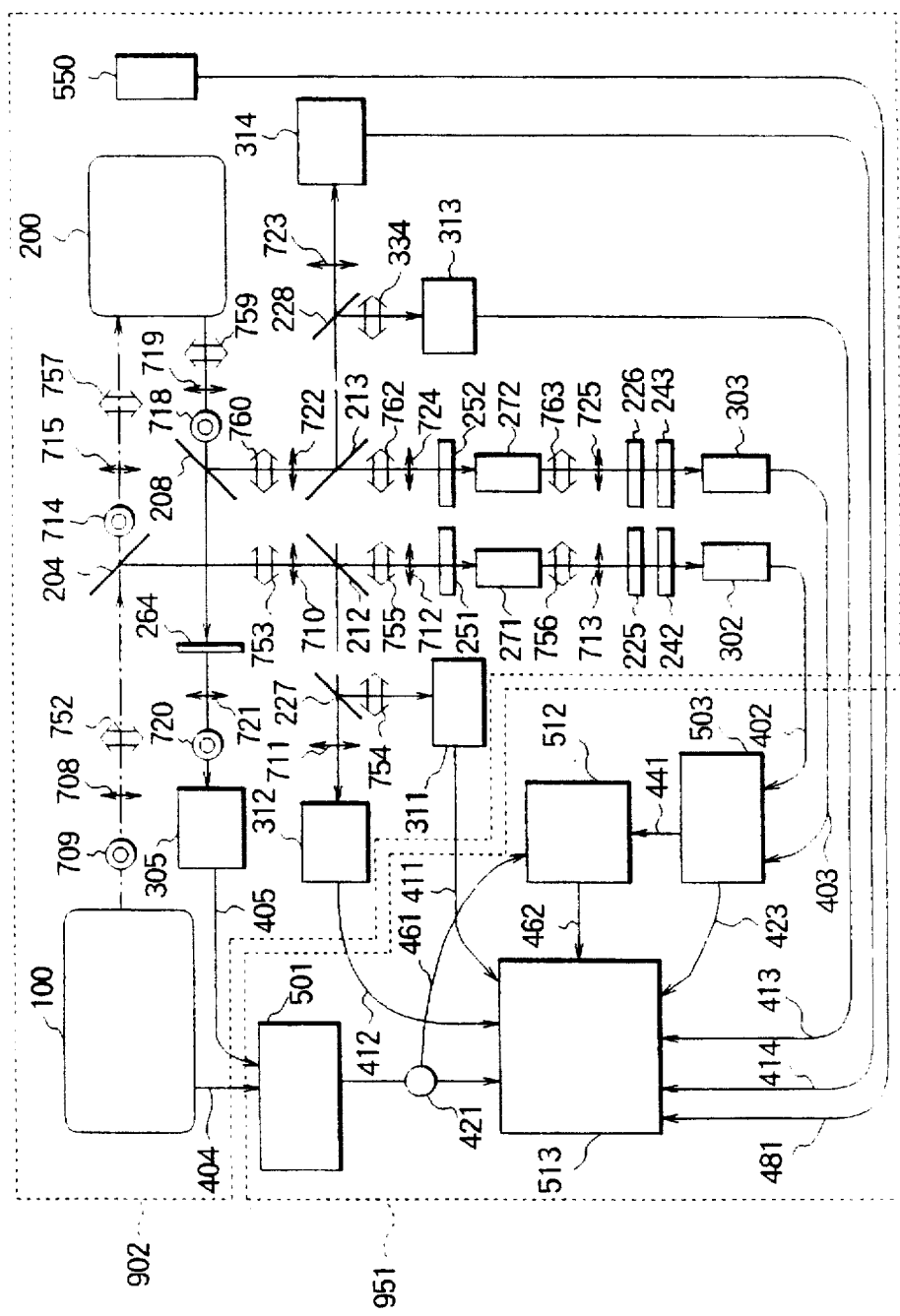
FIG. 2 is a block diagram showing the schematic arrangement of the second embodiment of the present invention.

FIG. 2 shows another embodiment of the present invention. In this embodiment, a light beam having a frequency f3 is equal to a light beam having a frequency f1, only the differences between the arrangement in FIG. 2 and the arrangement in FIG. 1 will be described.

Figure 3:
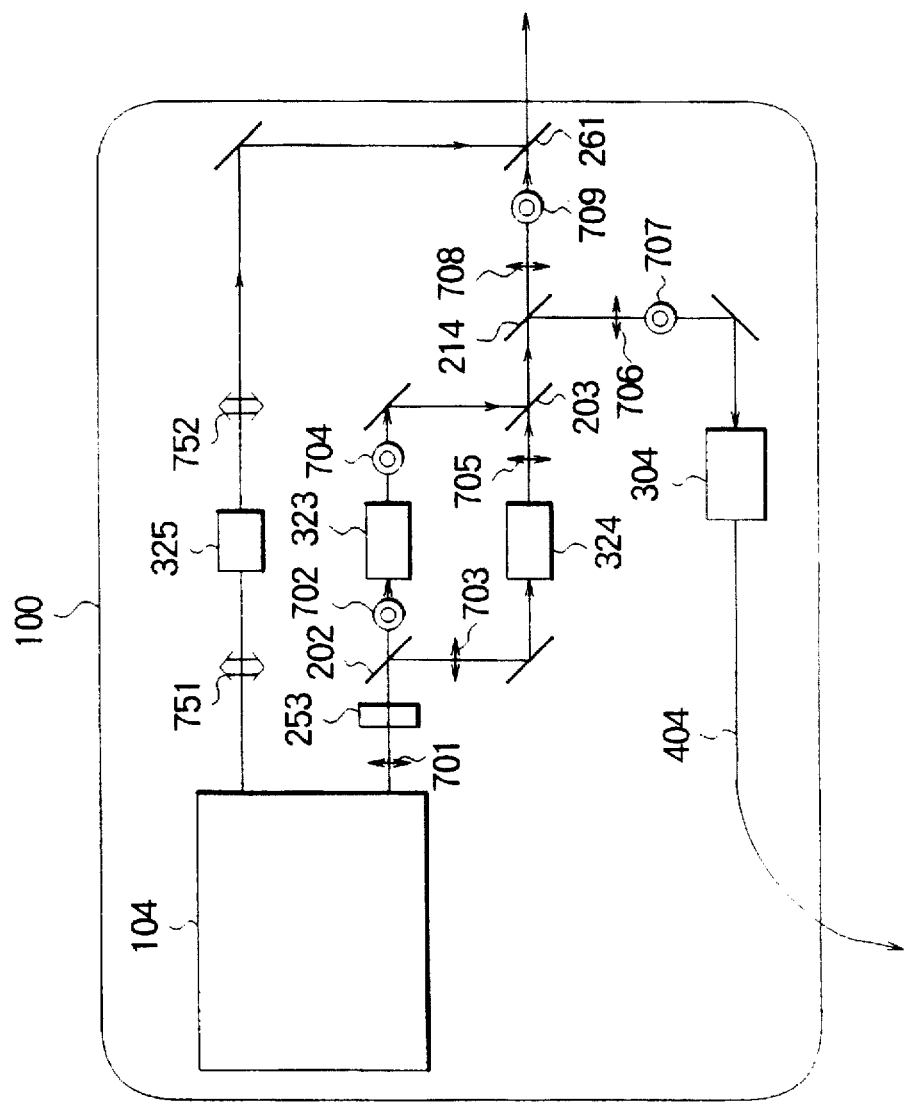
FIG. 3 is a block diagram showing the schematic arrangement of a light source section in the second embodiment of the present invention.

A light source section 100 has the arrangement shown in FIG. 3. Referring to FIG. 3, a light source 104 is a frequency stabilizing laser using, e.g., the absorption line of iodine, and incorporating a wavelength conversion element and the like. The light source 104 emits a light beam 701 having the frequency f1 and a light beam 751 having a frequency f2 which is twice the frequency f1.

The polarization azimuth of the light beam 701 having the frequency f1 can be arbitrarily changed by a $\lambda/2$ plate 253. The light beam 701 having passed through the $\lambda/2$ plate 253 is split into a light beam 702 having a polarization azimuth perpendicular to the drawing surface (to be referred to as an s-polarized light beam hereinafter) and a light beam 703 having a polarization azimuth parallel to the drawing surface (to be referred to as a p-polarized light beam hereinafter) by a polarization beam splitter 202. In this case, by rotating the $\lambda/2$ plate 253, the intensity of the light beam 703 is set to be about 100 times that of the light beam 702.

This intensity ratio is determined by the intensity of the light having the frequency f1 and emitted from the light source 104, the conversion efficiencies of wavelength conversion elements 271 and 272, the light detection sensitivities of photoelectric conversion elements 304 and 305 for displacement measurement and photoelectric conversion elements 302 and 303 for refractive index variation measurement, the intensity loss caused by each optical element in each optical path, and the like. In general, the conversion efficiency of each wavelength conversion element is several % or less. The above division ratio is set to make light beams incident on the photoelectric conversion elements 304 and 305, 302 and 303 have almost the same intensity of each couple.

The light beams 702 and 703 undergo slightly different frequency shifts in frequency shifters 323 and 324 to become a light beam 704 having a frequency f11 (=f1 +$\Delta$f1) and a light beam 705 having a frequency f12 (=f1+$\Delta$f1'). Note that the frequency shifters 323 and 324 are, for example, acousto-optic modulators or the like.

The light beams 704 and 705 are coupled by a polarization beam splitter 203 to become almost coaxial. The light beams 704 and 705 having different polarization azimuths are partly reflected by a beam splitter 214, and light beams 706 and 707 are incident on the photoelectric conversion element 304 with a polarizer. Note that the polarization azimuth of the polarizer (not shown) is inclined at 45° with respect to the light beams 706 and 707. The light beams 706 and 707 pass through the polarizer to interfere with each other, and are received by the photoelectric conversion element 304.

Figure 4:
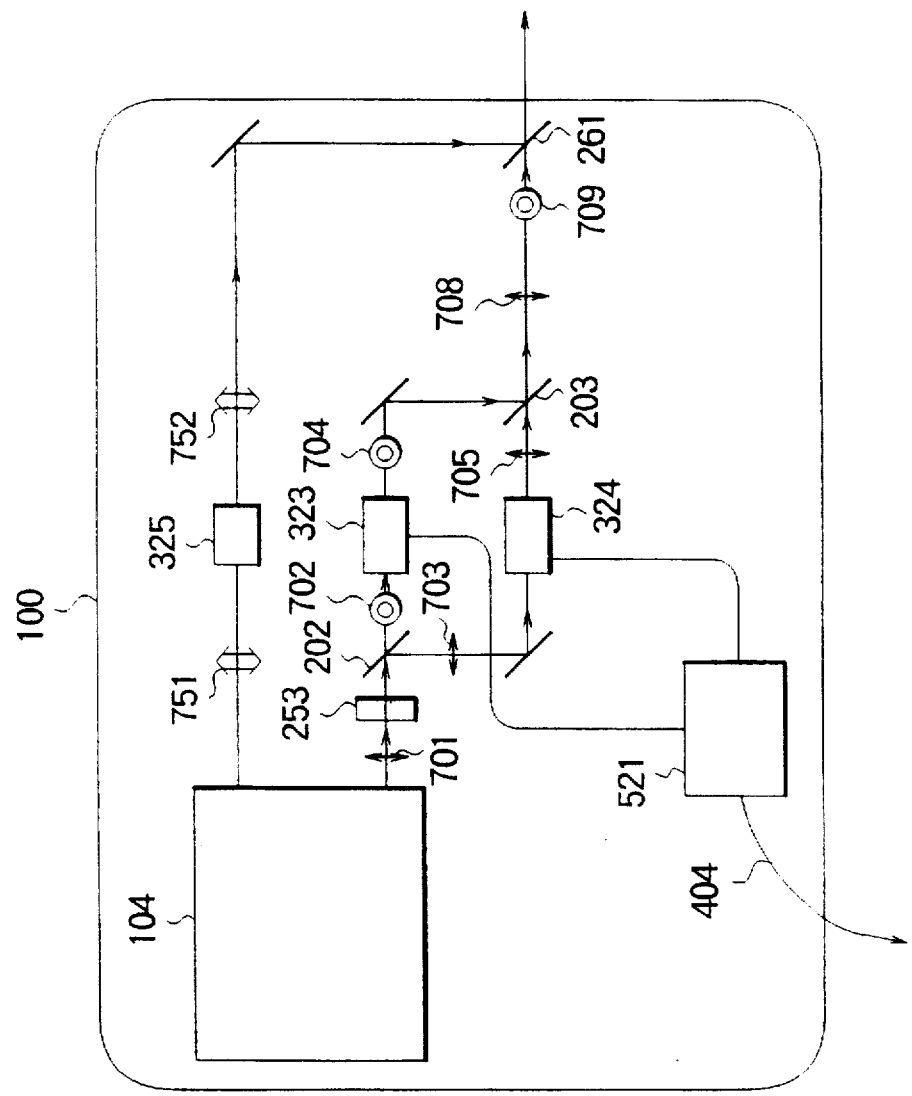
FIG. 4 is a block diagram showing the schematic arrangement of another form of the light source section in the second embodiment of the present invention.

The output from the photoelectric conversion element 304 is input as a reference signal 404 (frequency ($\Delta$f1–$\Delta$f1')) to a phase mater 501. In this case, the reference signal 404 may be obtained by the method shown in FIG. 4. Referring to FIG. 3, the reference signal 404 is obtained from the interference light of the light beams 704 and 705. In contrast to this, in FIG. 4, the difference between drive frequencies output from a frequency shifter driver 521 to drive the frequency shifters 323 and 324 is extracted to be used as the reference signal 404. Note that other arrangements in FIG. 4 are the same as those in FIG. 3.

Meanwhile, the light beam 751 having the frequency f2 is incident on a wavelength shifter 325 to undergo a wavelength shift different from a frequency twice $\Delta f1$ so as to become a p-polarized light beam 752 having a frequency f21 (=f2+$\Delta f2$).

Light beams 708 and 709 transmitted through the beam splitter 214 and the light beam 752 are adjusted by a wavelength selection element 261 to be almost coaxial. The resultant light beams propagate toward a polarization beam splitter 204 in FIG. 2.

Light components (light beam 710: frequency f12; light beam 753: frequency f21) of the p-polarized light beams 708 and 752 having the frequencies f12 and f21, of the three light beams 752, 708, and 709 incident on the polarization beam splitter 204, which correspond to about ¼ the intensity of the light beams 708 and 752 are reflected by the polarization beam splitter 204. The remaining light components of the light beams 708 and 752 and the s-polarized light beam 709 (light beam 714: frequency f11; light beam 715: frequency f12; light beam 757: frequency f21) are transmitted through the polarization beam splitter 204.

A beam splitter may be used in place of the polarization beam splitter 204. In this case, a polarization beam splitter may be placed on the reflected light side to attenuate an unnecessary s-polarized light beam. In addition, the ratio of light reflected by the beam splitter to light transmitted therethrough must be set to be a proper value.

The light beams 753 and 710 having the frequencies f21 and f12 and reflected by the polarization beam splitter 204 respectively correspond to the light beams having frequencies f2' and f1' which have been reflected by the wavelength selection element 224 in FIG. 1 and passed through the reference optical path. Thereafter, the light beams 753 and 710 therefore undergo the same effects as those on the light beams having the frequencies f1' and f2' which have passed through the reference optical path in FIG. 1. The resultant light beams are incident on light beam position monitors 311 and 312 and the photoelectric conversion element 302. Therefore, the same reference numerals in FIG. 2 denote the same parts as in FIG. 1, and a detailed description thereof will be omitted.

The output from the photoelectric conversion element 302 is input to a phase mater 503 as an interference signal 402 serving as a reference signal for refractive index variation measurement.

Light beam position signals 411 and 412 from the light beam position monitors 311 and 312 are input to a processing device 513.

Figure 5:
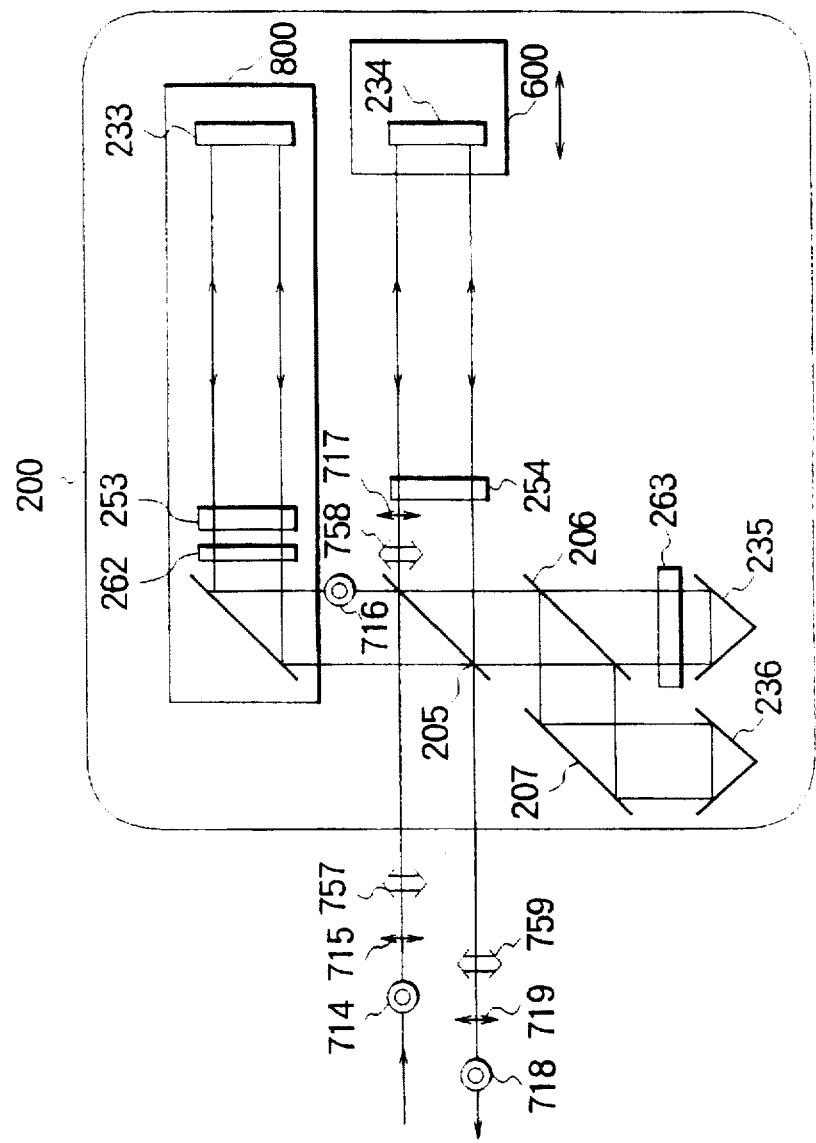
FIG. 5 is a block diagram showing the schematic arrangement of an interference section in the second embodiment of the present invention.

Meanwhile, the three light beams 714 (frequency f11), 715 (frequency f12), and 757 (frequency f21) transmitted through the polarization beam splitter 204 are incident on an interference section 200. FIG. 5 shows the detailed arrangement of the interference section 200.

The light beams 714, 715, and 757 are incident on a polarization beam splitter 205. Only the s-polarized light beam 714 is reflected to the reference optical path to become a light beam 716. At this time, the p-polarized light beams 715 and 757 are not ideally reflected by the polarization beam splitter 205. In practice, however, the p-polarized light beam is also reflected in accordance with the extinction ratio of the polarization beam splitter.

In this case, a slight amount of light beam 757 having the frequency f21 and reflected by the polarization beam splitter 205, which is incident on the photoelectric conversion element 303 to become a cause for an error in refractive index variation measurement, is removed by a wavelength selection element 262. The reflected light beam 716 having the frequency f11 is transmitted through the $\lambda/4$ plate 253 for light having the frequency f11, and is reflected by a stationary mirror 233 almost coaxially to be transmitted through the $\lambda/4$ plate 253 again. In this case, when the light beam 716 having the frequency f11 passes through the $\lambda/4$ plate 253 twice, the polarization azimuth is rotated through 90°. As a result, the light beam becomes a p-polarized light beam and passes through the polarization beam splitter 205 and a polarization beam splitter 206. Thereafter, the light beam is transmitted through a wavelength selection element 263 and reflected by a corner cube prism 235. The resultant light beam is transmitted through the polarization beam splitters 206 and 205 again to be incident on the reference optical path. The light beam 716 incident on the reference optical path is reflected by the stationary mirror 233 and passes through the $\lambda/4$ plate 253 twice in the same manner as described above. As a result, the polarization azimuth is rotated through 90°, and the light beam returns as an s-polarized light beam to the polarization beam splitter 205. The light beam 716 is then reflected by the polarization beam splitter 205 and emerges toward a polarization beam splitter 208 in FIG. 2 (light beam 718). In this case, since variations in refractive index on the reference optical path are not monitored, the entire optical path is covered with an air tube 800 to suppress local refractive index variations on the reference optical path.

Meanwhile, light beams 758 and 717 having the frequencies f21 and f12, which have been transmitted through the polarization beam splitter 205, are transmitted through a $\lambda/4$ plate 254 for light beams having two frequencies, i.e., the frequencies f21 and f12, and are reflected by the movable mirror 234 to be transmitted through the $\lambda/4$ plate 254 again. As a result, the polarization azimuths of these light beams are rotated through 90°0, and the light beams become s-polarized light beams. The s-polarized light beams are reflected by the polarization beam splitter 205. The light beams 758 and 717 reflected by the polarization beam splitter 205 are reflected by the polarization beam splitter 206 and a polarization beam splitter 207 to be incident on a corner cube prism 236. The light beams 758 and 717 are reflected by the corner cube prism 236, and are reflected by the polarization beam splitters 207, 206, and 205 again to be incident on the measurement optical path. The light beams 758 and 717 which are incident on the measurement optical path again are transmitted through the $\lambda/4$ plate 254, reflected by a movable mirror 234, and transmitted through the $\lambda/4$ plate 254 again. As a result, the polarization azimuths are rotated through 90°, and the light beams become p-polarized light beams. These p-polarized light beams are transmitted through the polarization beam splitter 205.

The light beam 758 having the frequency f21 which is transmitted through the polarization beam splitter 206 and propagates toward the corner cube prism 235 is removed by the wavelength selection element 263 because the light beam 758 becomes a cause for an error in refractive index variation measurement if it is incident on a photoelectric conversion element 303.

As described above, light beams passing through the reference and measurement optical paths are transmitted through or reflected by the polarization beam splitters 205, 206, and 207 several times. For this reason, even if one polarization beam splitter has a low extinction ratio, since the polarization azimuths of the light beam 718 and light beams 719 and 759 finally emerging from the polarization beam splitter 205 are close to those of light beams emerging from the ideal polarization beam splitter 205, the measurement accuracy can be improved.

The respective light beams having passed through the reference and measurement optical paths twice in the above manner become almost coaxial and emerge toward the polarization beam splitter 208 (light beam 718: frequency f11; light beam 719: frequency f12; light beam 759: frequency f21).

The polarization beam splitter 208 is designed to have a low extinction ratio for only p-polarized light components having frequencies near the frequency f1. The polarization beam splitter 208 transmits the s-polarized light beam 718 having the frequency f11 and a light beam 721 as part of the p-polarized light beam 719 having the frequency f12. The two transmitted light beams (720 and 721) are incident on the photoelectric conversion element 305 with a polarizer. The extinction ratio of the polarization beam splitter 208 for p-polarized light components having frequencies near the frequency f1 is set such that the intensity of a light beam 722 becomes about 100 times that of the light beam component 721. In this case, the light beam 759 having the frequency f21, which is transmitted through the polarization beam splitter 208 and becomes a cause for an error in measurement of the displacement of the movable mirror 234 on the basis of light having the frequency f1, is removed by a wavelength selection element 264.

The light beams 720 and 721 pass through the polarizer to interfere with each other. The resultant light is received by the photoelectric conversion element 305. The output from the photoelectric conversion element 305 is input to the phase mater 501 as a measurement signal 405 (frequency ($\Delta$f1-$\Delta$f1')) which has been influenced by the displacement of the movable mirror and the refractive index variation of the measurement optical path.

If it is difficult to design and manufacture optical thin films for the polarization beam splitter 208, a beam splitter and a polarization beam splitter can be used in place of the polarization beam splitter 208. In this case, the beam splitter may be placed at the position of the polarization beam splitter 208 in FIG. 2, and the polarization beam splitter may be placed on the reflection side (photoelectric conversion element 303 side) to attenuate the light beam 718 which becomes a stray light beam.

A light beam 760 having the frequency f21 and the light beam 722 having the frequency f12, which are reflected by the polarization beam splitter 208, respectively correspond to the light beams having the frequencies f2' and f1' which have been reflected by the wavelength selection element 224 in FIG. 1 and passed through the measurement optical path. Thereafter, the light beams 760 and 722 therefore undergo the same effects as that on the light beams having the frequencies f2' and f1' which have passed through the measurement optical path in FIG. 1. The resultant light beams are incident on light beam position monitors 313 and 314 and the photoelectric conversion element 303. Therefore, the same reference numerals in FIG. 2 denote the same parts as in FIG. 1, and a detailed description thereof will be omitted.

The output from the photoelectric conversion element 303 is input to the phase mater 503 as an interference signal 403 which is a measurement signal obtained by refractive index variation measurement.

The light beam position signals 413 and 414 from the light beam position monitors 313 and 314 are input to the processing device 513.

In order to minimize the influences of unnecessary refractive index variations on portions other than displacement-measurement optical paths of the interferometer, the displacement-measurement optical paths may be covered with air tubes and the like. That is, air tubes and the like cover the optical path of a light beam reflected by the polarization beam splitter 204 and propagating to the photoelectric conversion element, the optical paths split by the polarization beam splitter 208, the optical path (excluding the reference optical path and the measurement optical path) on which one of three light beams having different wavelengths and having been made coaxial by the wavelength selection element 261 is separated, and the like, thereby enabling high-accuracy measurement. In addition, the measurement accuracy may be improved by evacuating the air tubes, and reducing the refractive index variations in the air tubes.

According to the above description, displacement measurement is simultaneously performed with light beams having lower frequencies. In principle, however, displacement measurement can be performed with light beams having high frequencies. In contrast to this, in this case, only light beams having high frequencies are caused to pass through the reference optical path.

An electric system section 951 performs the same operation as that described above except that the reference and measurement signals 404 and 405 are input to the phase mater 501, and hence a description of the operation will be omitted.

In the above embodiment, the electric system section 951 is connected to only optical system sections 901 and 902. However, the present invention is not limited this. The present invention can be applied to any apparatus including an optical means for detecting the difference {$\Delta$D(fb)–$\Delta$D(fa)} between $\Delta$D(fa) corresponding to the displacement of an object which is detected by using a light beam having a frequency fa, and $\Delta$D(fb) corresponding to the displacement of the object which is detected by using a light beam having a frequency fa different from the frequency fa, and an optical means for detecting a displacement $\Delta$D(fc) of the object by using a light beam having a frequency fc.

In the above embodiment, a detection result $\Delta$M(td) at time td is obtained from i data $\Delta$D(f3,t1), $\Delta$D(f3,t2), . . . , $\Delta$D(f3,ti). In this case, i is a natural number. A detection result $\Delta$M(k+1) at (k+1) time can be calculated by using a detection result M(k) at k time and $\Delta$D(f3). That is, $\Delta$M(k+1) is calculated according to $\Delta$M(k+1)=a·$\Delta$M(k)+b·$\Delta$(f3,k+1)+C, where a, b, and c are appropriate constants. In this case, the above i data need not be stored.

As described above, according to the present invention, there is provided an optical interference measuring apparatus which can correct a displacement-measurement error accompanying an air refractive index variation in real time, and can perform high-precision displacement measurement even if a local refractive index variation occurs.

Another optical interference measuring apparatus to be compared with the apparatus of the present invention will be described next with reference to FIG. 21.

Note that reference symbol $\omega$ will be used to indicate a frequency in the following description so as to prevent confusion in relation to the above embodiment. The optical interference measuring apparatus in FIG. 21 uses a light source 1102 for measuring the displacement of a movable mirror 1183 in the optical axis direction, and a light source 1101 for measuring a variation in a refractive index n of air or another gas on an optical path.

The light source 1102 emits a light beam having a frequency $\omega_1$ and a light beam having a frequency $\omega_1'$, and a polarization azimuth perpendicular to that of the light beam having the frequency $\omega_1$. The frequency $\omega_1'$ is slightly different from the frequency $\omega_1$. The light source 1101 emits light beams having frequencies $\omega_2$ and $\omega_3$ (=$2\omega_2$) different from the frequencies $\omega_1$ and $\omega_1'$. The light beams having the frequencies $\omega_2$ and $\omega_1$ are made almost coaxial by a wavelength coupling element 1144 such as a dichroic mirror (to be referred to as a DM hereinafter). In addition, the three light beams having the different wavelengths (the light beams having the frequencies $\omega_1$ (including the frequency $\omega_1'$), $\omega_2$, and $\omega_3$3) are adjusted to become almost coaxial by a wavelength coupling element 1141, and are incident on a polarization beam splitter (to be referred to as a PBS hereinafter) 1124. The PBS 1124 splits the three light beams having the different wavelengths into the light beams to propagate in a reference optical path on a stationary mirror 1182 side and a displacement-measurement optical path on a movable mirror 1183 side. In this case, the light sources 1101 and 1102 are arranged such that only the light beam having the frequency $\omega_1$ is reflected by the PBS 1124 to be incident on the reference optical path, and the light beams having the frequencies $\omega_1'$, $\omega_2$, and $\omega_3$ are transmitted through the PBS 1124 to be incident on the displacement-measurement optical path.

Figure 21:
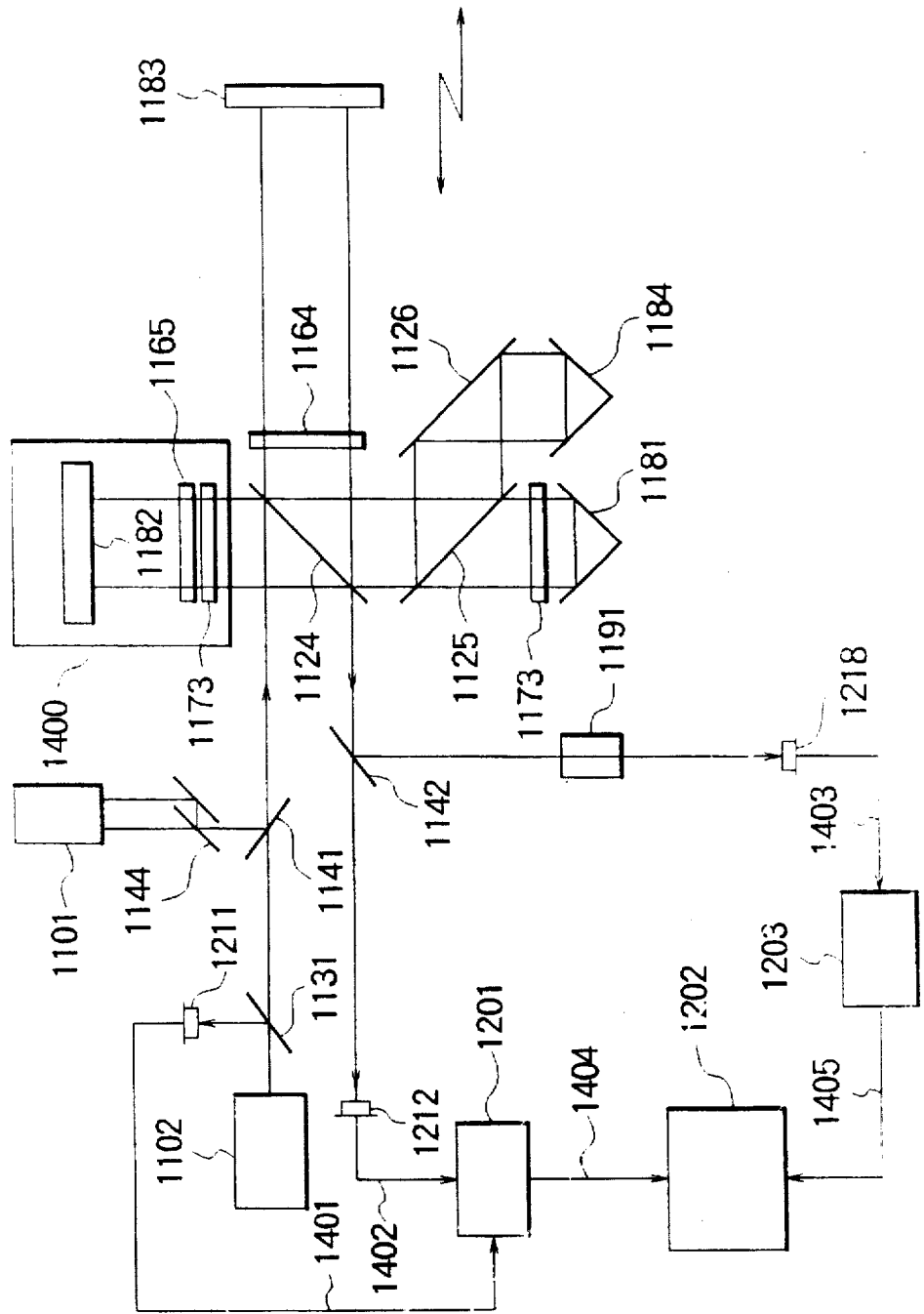
FIG. 21 is a block diagram showing the schematic arrangement of an optical interference measuring apparatus.

In the apparatus shown in FIG. 21, two light beams having different frequencies which are emitted from the light source 1101 are made to propagate in only the displacement-measurement optical path. For this reason, although a refractive index variation on the displacement-measurement optical path can be monitored, a refractive index variation on the reference optical path cannot be monitored. The reference optical path is therefore covered with an air tube 1400 to minimize a refractive index variation on the reference optical path.

The PBS 1124 constitutes a three-stage structure, together with PBSs 1125 and 1126, to obtain a high extinction ratio as a whole. In addition, a frequency filter 1173 is inserted in this structure to suppress crosstalk which causes a deterioration in displacement-measurement accuracy. The frequency filter 1173 absorbs light beams having the frequencies $\omega_2$ and $\omega_3$ and transmits light beams having the frequencies $\omega_1$ and $\omega_1'$. These light beams pass through their optical paths twice via the PBS 1124, 1125, 1126, λ/4 plates 1164 and 1165, the frequency filter 1173, the movable mirror 1183, stationary mirror 1182, and corner cube prism 1181, 1184. Thereafter, the light beams emerge from the PBS 1124 almost coaxially toward a wavelength separation element 1142 constituted by a DM and the like.

Subsequently, the light beams having the frequencies $\omega_1$ and $\omega_1'$ are transmitted through the wavelength separation element 1142 to be separated from the light beams having other frequencies. These light beams are then incident on a photodetector 1212 to become a displacement-measurement signal 1402. In addition, part of the light emitted from the light source 1102 is reflected by a beam splitter (to be referred to as a BS hereinafter) 1131. The light reflected by the BS 1131 is incident on a detector 1211 to become a reference signal 1401. The reference signal 1401 and the displacement-measurement signal 1402 are input to a phase meter 1201. The phase meter 1201 calculates a displacement amount $D(\omega_1)$ of the movable mirror on the basis of the two input signals, and outputs a displacement signal 1404 corresponding to the displacement amount $D(\omega_1)$ to an arithmetic unit 1202. At this time, the displacement amount $D(\omega_1)$ is measured by a heterodyne interferometry. In this case, as described above, the measured displacement amount $D(\omega_1)$ contains an error component based on a variation in the refractive index of air.

Meanwhile, the light beams having the frequencies $\omega_1$ and $\omega_3$ are reflected by the wavelength separation element 1142 to be separated from the light beams having the frequencies $\omega_1$ and $\omega_1'$, and are incident on an SHG conversion element 1191. The light beam having the frequency $\omega_2$ is converted into the second harmonic wave by the SHG conversion element 1191 to interfere with the light beam having frequency $\omega_3$. This interference light is incident on a photodetector 1218 and input as an interference signal 1403 to a phase meter 1203. The phase meter 1203 calculates a phase difference $D(\omega_3)-D(\omega_2)$ between the light beams having the frequencies $\omega_2$ $_{and}$ $_{\omega 3}$, which has passed through the displacement-measurement optical path, on the basis of the interference signal 1403, and outputs a phase difference signal 1405 corresponding to $D(\omega_3)-D(\omega_2)$ to the arithmetic unit 1202. At this time, the phase difference $D(\omega_3)-D(\omega_2)$ is measured by a homodyne interferometry, and is used to measure a refractive index variation.

The arithmetic unit 1202 receives the displacement signal 1404 corresponding to the displacement amount $D(\omega_1)$ of the movable mirror 1183 and the phase difference signal 1405 corresponding to the measurement value $(D(\omega_3)-D(\omega_2))$ of a change in optical path length which is caused by a variation in the refractive index n, and obtains a true displacement amount (geometric distance) D by the following calculation:

$$D=D(\omega_1)-A[D(\omega_3)-D(\omega_2)] \tag{33}$$

for $$A=K(\omega_1)/[K(\omega_3)-K(\omega_2)]$$

where $K(\omega_1)$, $K(\omega_2)$, and $K(\omega_3)$ are the functions representing the wavelength dispersion characteristics corresponding to the respective frequencies $\omega$.

The optical interference measuring apparatus in FIG. 21 uses three light beams having different frequencies to perform displacement measurement and refractive index variation measurement. For this reason, the thin-film design for optical elements such as DMs and PBSs, the design for optical systems, and the like are complicated. That is, since optical elements exhibit different characteristics depending on the frequencies of light beams to be used, the design for optical elements and optical systems is complicated with an increase in the number of types of light beams to be used.

An apparatus according to the following embodiment allows simplification of the design for optical systems and optical elements associated with the above three wavelengths.

For this purpose, the optical interference measuring apparatus of the present invention measures the displacement of an object to be measured by using one of two light beams having different frequencies and emitted from a light source, and measures a refractive index variation by using the two light beams. One of the two light beams emitted from the light source is made to pass through a reference optical path, and both the light beams are made to pass through a displacement-measurement optical path. That is, only a variation in the refractive index of air in the displacement-measurement optical path is measured, but a variation in the refractive index of air in the reference optical path is not measured.

The principle of measurement will be briefly described first. In general, a refractive index n is given by $$n = 1 + NK(\omega) \quad (34)$$

where N is the density of air, and $K(\omega)$ is the wavelength dispersion characteristic. Let $n_1$ and $n_2$ be the refractive indexes at the frequencies $\omega_1$ and $\omega_2$, $D(\omega_1)$ and $D(\omega_2)$ be the optical path lengths, and D be the geometric distance. The optical path lengths at the respective frequencies can be given according to equation (34), as follows:

$$D(\omega_1) = n_1 D = [1 + NK(\omega_1)]D \quad (35)$$

$$D(\omega_2) = n_2 D = [1 + NK(\omega_2)]D \quad (36)$$

If the both sides of the above equations are subtracted from each other, then $$D(\omega_1) - D(\omega_2) = ND[K(\omega_1) - K(\omega_2)] \quad (37)$$

In addition, from equation (35), $$N = [D(\omega_1) - D]/DK(\omega_1) \quad (38)$$

Therefore, the geometric distance D is given by $$D = D(\omega_1) - A[D(\omega_2) - D(\omega_1)] \quad (39)$$

for $$A = K(\omega_1)/[K(\omega_2) - K(\omega_1)]$$

In this case, it is apparent that the coefficient A can be regarded as a constant unless the composition of air changes. Equation (39) indicates that the optical path length $D(\omega_1)$ measured with the light beam having the frequency $\omega_1$ on the first term of the right-hand side is corrected with a change in optical path length difference caused by refractive index dispersion on the second term of the right-hand side. Equation (39) is used to obtain not only the geometric distance D but also a displacement D of an object to be measured by detecting $D(\omega_1)$ and $D(\omega_2)$ in equation (39) as changes in optical path length at the respective frequencies. That is, in the present invention, a geometric distance or optical path length is a value containing the respective displacements.

The present invention includes a means for detecting $D(\omega_1)$ and $(D(\omega_2) - D(\omega_1))$ in equation (39), and obtains the geometric distance D by calculating the detection result according to equation (39).

An embodiment indicating the detailed arrangement of the means for detecting $D(\omega_1)$ and $(D(\omega_2) - D(\omega_1))$ will be described next with reference to the accompanying drawings.

Figure 13:
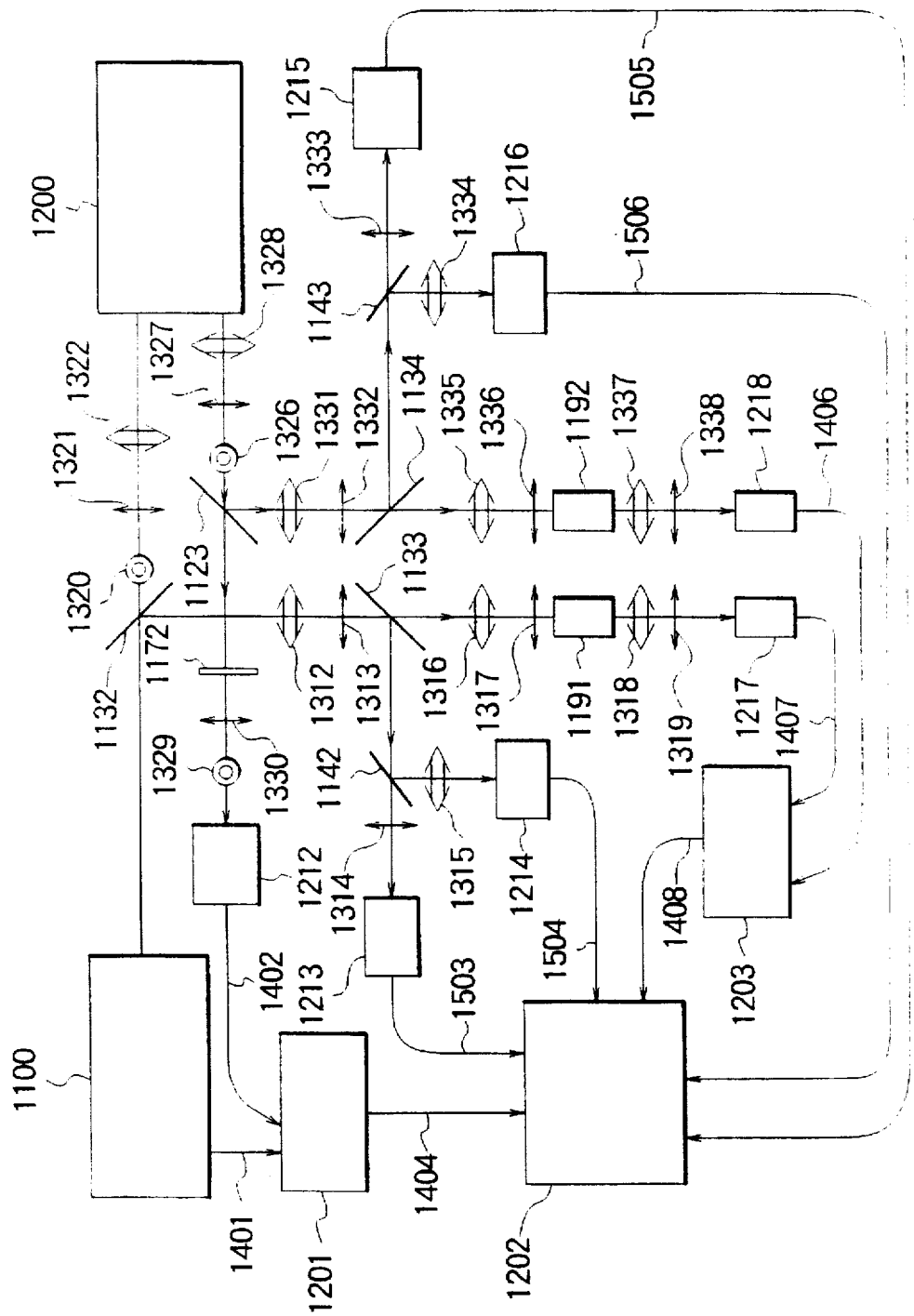
FIG. 13 is a block diagram showing the schematic arrangement of an optical interference measuring apparatus according to still another embodiment of the present invention.

FIG. 13 shows an optical system indicating an embodiment of the optical interference measuring apparatus of the present invention.

Figure 14:
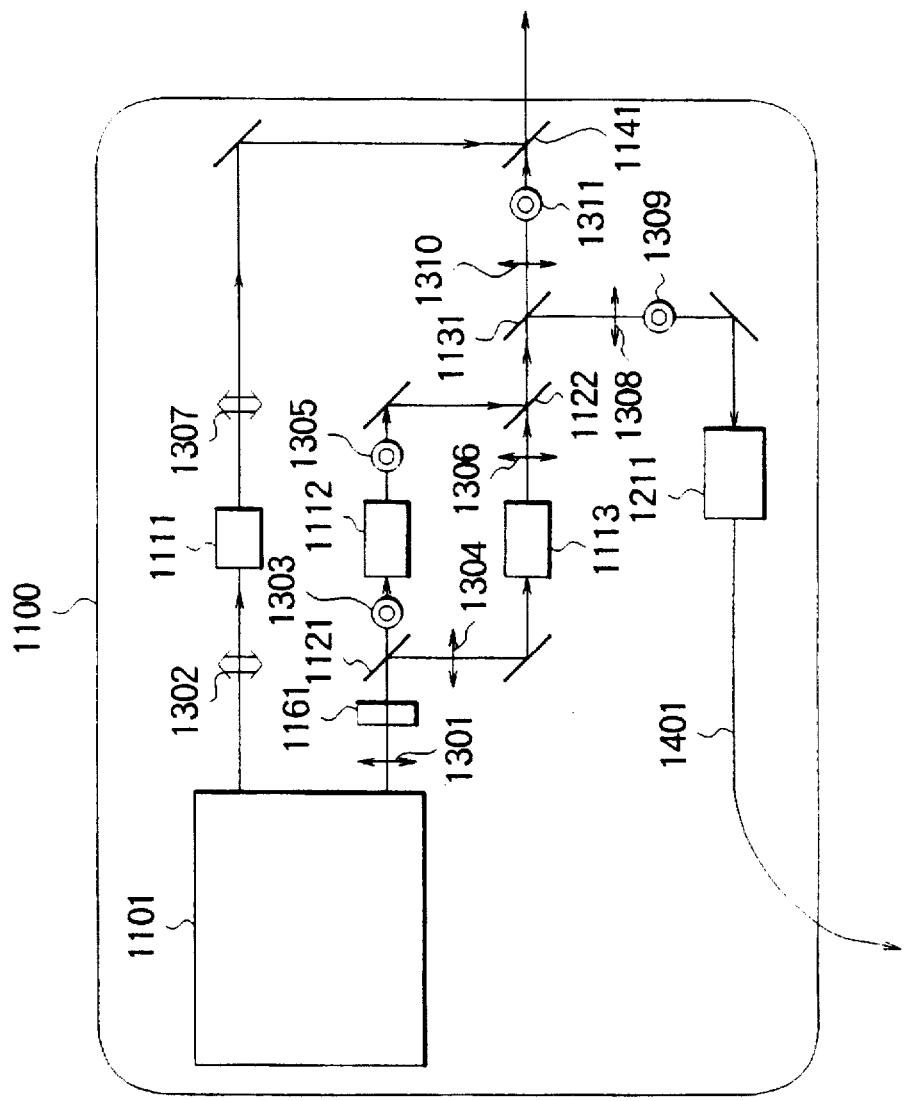
FIG. 14 is a block diagram showing the schematic arrangement of a light source section 1100 in the embodiment in FIG. 13.
Figure 15:
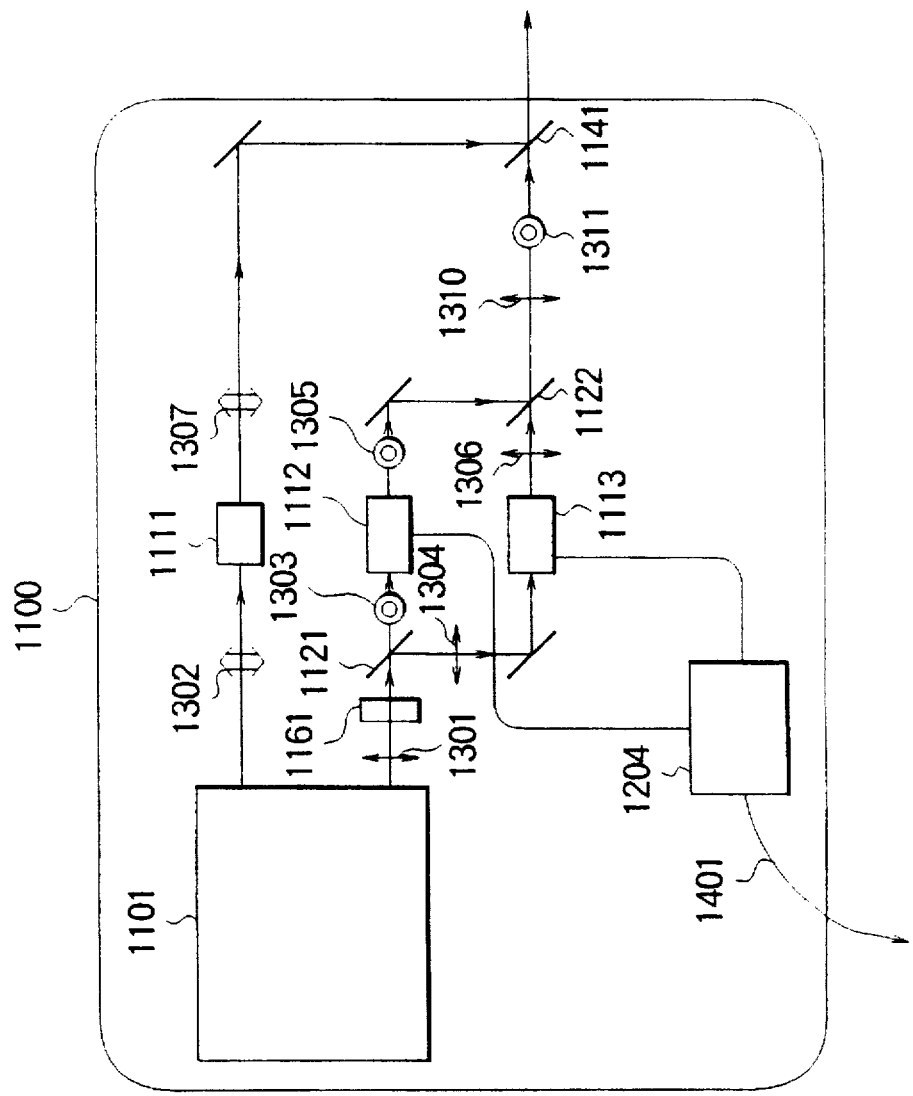
FIG. 15 is a block diagram showing the schematic arrangement of another light source section 1100 in the embodiment in FIG. 13.

A light source section 1100 emits two light beams having frequencies $\omega_1$ and $\omega_2$. FIG. 14 shows the detailed arrangement of the light source section 1100. A light source 1101 in FIG. 14 is a frequency stabilizing laser using the absorption line of iodine, and incorporating a second harmonic wave conversion element and the like. The light source 1101 emits a light beam 1301 (a fundamental wave to be referred to as an FND hereinafter) having the frequency $\omega$ and a light beam 1302 (a second harmonic wave to be referred as an SHG hereinafter) having the frequency $\omega_2$ which is twice the frequency $\omega_1$. More specifically, as the light source 1101, a light source for emitting a fundamental wave (FND) having a wavelength of 1.064 nm and an intensity of 200 mW, and a second harmonic wave (SHG) having a wavelength of 532 nm and an intensity of 100 mW is used. The polarization azimuth of the light beam 1301 having the frequency $\omega_1$ can be arbitrarily changed by a $\lambda/2$ plate 1161. The light which has passed through the $\lambda/2$ plate 1161 is split into a light beam 1303 having a polarization azimuth perpendicular to the drawing surface (s-polarization) and a light beam 1304 having a polarization azimuth parallel to the drawing surface (p-polarization) by a polarization beam splitter (PBS) 1121. In this case, the intensity ratio of the light beam 1303 to the light beam 1304 is preferably adjusted to a proper value by rotating the $\lambda/2$ plate 1161. In this case, the intensity of the light beam 1303 is set to be 100 times that of the light beam 1304. The light beams 1303 and 1304 undergo slightly different frequency shifts in frequency shifters 1112 and 1113 constituted by acousto-optic modulators (AOMs) to become a light beam 1305 having a frequency $\omega_{11}$ ($=\omega_1 + \Delta\omega_1$) and a light beam 1306 having a frequency $\omega_{12}$ ($=\omega + \Delta\omega_1'$). In this case, the light beams 1303 and 1304 are frequency-modulated to perform measurement by using the heterodyne interferometry. The following are the reasons why the heterodyne interferometry is used: this method is resistant to changes in the intensities of light beams emitted from the light sources; measurement frequencies can be easily band-limited; and the moving direction of a movable mirror 1183 can be easily discriminated. With regard to (measurement frequencies can be easily band-limited), in particular, $\Delta\omega_1$ is set to a frequency of 10.1 MHz, and $\Delta\omega_1'$ is set to a frequency of 10 MHz so as to shift the measurement frequencies from a frequency band in which the noise level of a measurement environment is high. The light beams 1305 and 1306 are coupled by a PBS 1122 to be almost coaxial. Some light components (light beams 1308 and 1309) of the two light beams 1305 and 1306 having different polarization azimuths are reflected by a beam splitter (BS) 1131, and light beams 1308 and 1309 are incident on a detector 1211 with a polarizing plate. Note that the polarization azimuth of the polarizing plate (not shown) is inclined at 45° with respect to the light beams 1308 and 1309. When the light beams 1308 and 1309 pass through the polarizing plate, these light beams interfere with each other, and a beat signal equivalent to a frequency difference $\delta(=\Delta\omega_1 - \Delta\omega_1')$ between the two light beams is input as a reference signal 1401 to a displacement-measurement detection device 1201. In this case, the reference signal 1401 may be obtained by the method shown in FIG. 15. Referring to FIG. 14, in order to obtain a beat signal based on the light beams 1305 and 1306, the interference light produced by the two light beams is obtained by the detector 1211. In contrast to this, in FIG. 15, the difference between drive frequencies for driving the frequency shifters 1112 and 1113 is extracted as a beat signal, and this signal is used as the reference signal 1401. Note that the drive frequencies for driving the frequency shifters 1112 and 1113 correspond to the above frequencies $\Delta\omega_1$ and $\Delta\omega_1'$. Since other arrangements in FIG. 15 are the same as those in FIG. 14, a description thereof will be omitted.

The light beam 1302 having the frequency $\omega_2$ is incident on a frequency shifter 1111, and undergoes a frequency shift different from a frequency twice $\Delta\omega_1$ and $\Delta\omega_1'$ to become a p-polarized. light beam 1307 having a frequency $\omega_{21}$ (=$\omega_2$+ $\Delta\omega_2$). Note that the light beam 1302 is also modulated to use the heterodyne interferometry described above, and ←$\omega_1$ s set to 18 MHz. Light beams 1310 and 1311 transmitted through the BS 1131 and the light beam i307 are adjusted to be almost coaxial by a wavelength coupling element 1141, and propagate toward a PBS 1132 in FIG. 13.

Light components (light beam 1313: frequency $\omega_{12}$; light beam 1312: frequency $\omega_{2l}$) of the p-polarized light beams 1310 and 1307 having frequencies $\omega_{12}$ and $\omega_2$, of the three light beams 1307, 1310, and 1311 incident on the PBS 1132, which correspond to about ¼ the intensity of the light beams 1310 and 1307 are reflected by the PBS 1132. The remaining light components of the light beams 1310 and 1307 and the s-polarized light beam 1311 (light beam 1320: frequency $\omega_{11}$l; light beam 1321: frequency $\omega_{12}$; light beam 1322: frequency $\omega_{21}$) are transmitted through PBS 1132.

A BS may be used in place of the PBS 132. In this case, a PBS may be placed on the reflected light side (BS 1133 side) to attenuate an unnecessary s-polarized light beam. In addition, the ratio of light reflected by the BS to light transmitted therethrough can be set to be a proper value.

The two light beams 1312 and 1313 reflected by the PBS 1132 are partly reflected by the BS 1133. The two reflected light beams are further separated into a light beam 1314 having the frequency $\omega_{12}$ and a light beam 1315 having the frequency $\omega_{21}$ by a wavelength separation element 1142 constituted by a DM and the like. These light beams are the incident on position monitors 1213 and 1214 for detecting the direction of light emitted from the light source 1101. This operation is performed to correct a displacement-measurement value by using an output from each position monitor because the displacement-measurement value changes as the direction of light emitted from the light source changes. Note that the position monitors 1213 and 1214 include photoelectric conversion sections, and detect the positions of light beams incident on the photoelectric conversion sections. A method of correcting a measurement value based on a variation in the direction of light emitted from the light source will be described later.

Light beams 1316 and 1317 transmitted through the BS 1133 are incident on an SHG conversion element 1191. As a result, the light beam 1317 as an FND light beam is wavelength-converted into a light beam 1319 having the frequency $\omega_{12}$, (=2$\omega_{12}$). The light beam 1319 interferes with a light beam 1318 having the frequency $\omega_{21}$ as an SHG light beam transmitted through the SHG conversion element 1191. This interference light is measured by a photodetector 1217. The detector 1217 outputs a reference signal 1407 corresponding to the interference light to a phase meter 1203 for measuring an optical path length change caused by a variation in the refractive index of air.

Figure 16:
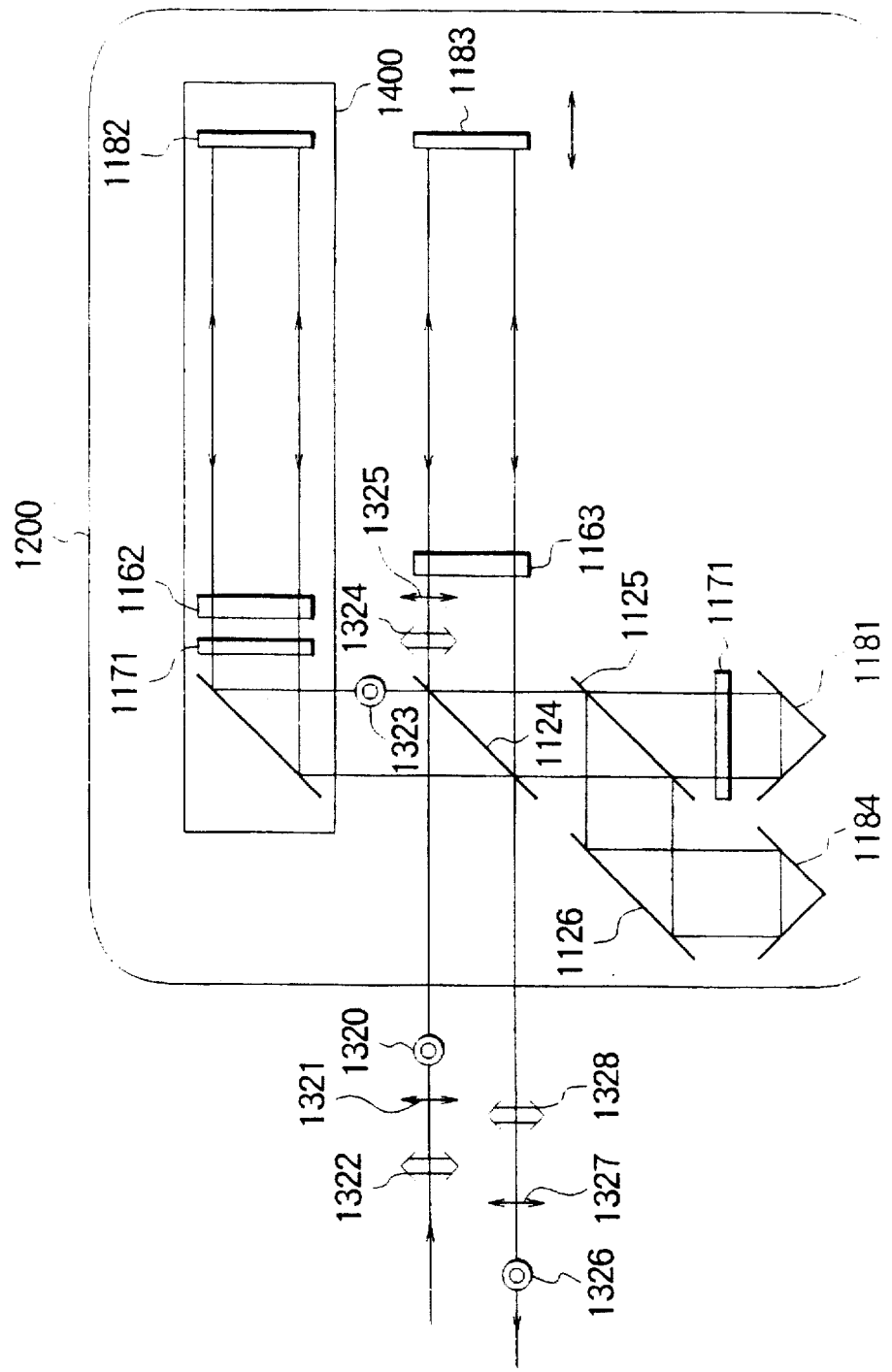
FIG. 16 is a block diagram showing the schematic arrangement of an interference section 1200 in the embodiment in FIG. 13.

The three light beams 1320 (frequency $\omega_{11}$) 1321 (frequency $\omega_{12}$), and 1322 (frequency $\omega_{21}$) transmitted through the PBS 1132 are incident on an interference section 1200. FIG. 16 shows the detailed arrangement of the interference section 1200.

The light beams 1320, 1321, and 1322 are incident on a PBS 1124, and only an s-polarized light beam 1323 is reflected to the reference optical path. At this time, SHG light as p-polarized light is not ideally reflected by the PBS 1124. In practice, however, even p-polarized light is reflected by the PBS 1124 in accordance with the extinction ratio of the PBS 1124. Although p-polarized light beams reflected by the PBS 1124 are FND and SHG light beams in this case, light incident on a detector 1218 for detecting a refractive index variation is light which is transmitted through an SHG conversion element 1192. Only FND light which has undergone SHG conversion is used for measurement. In this embodiment, since the conversion efficiency of SHG conversion is less than 1%, the intensity of unnecessary FND light is sufficiently decreased. For this reason, this FND light is not likely to cause a measurement error. However, since the above SHG conversion is not performed for SHG light, unnecessary SHG light reflected by the PBS 1124 is incident on the detector 1218 without a decrease in intensity. Therefore, this SHG light may greatly affect the precision of refractive index variation measurement. For this reason, a slight amount of SHG light reflected by the PBS 1124 is removed or reduced by an SHG cut filter (frequency filter) 1171. The reflected FND light beam 1323 is transmitted through an FND λ/4 plate 1162 and reflected by a stationary mirror 1182 almost coaxially to be transmitted through the FND λ/4 plate 1162 again. In this case, when the FND light beam 1323 passes through the FND λ/4 plate 1162 twice, the polarization azimuth is rotated through 90°. As a result, the FND light beam is p-polarized and transmitted through the PBS 1124 and a PBS 1125. Thereafter, the light beam is transmitted through an SHG cut filter (frequency filter) 1171 and reflected by a corner cube prism 1181. The reflected light is transmitted through the PBSs 1125 and 1124 again to be incident on the reference optical path. The light beam 1323 incident on the reference optical path again is reflected by the stationary mirror 1182, and passes through the FND λ/4 plate 1162 twice in the same manner as described above. As a result, the polarization azimuth of this light beam is rotated through 90°, and hence the light beam returns as an s-polarized light beam to the PBS 1124. The light beam 1323 is then reflected by the PBS 1124 to emerge toward a PBS 1123 in FIG. 13 (light beam 1326). In this case, since variations in refractive index on the reference optical path are not monitored, the entire optical path is covered with an air tube 1400 to suppress local refractive index variations on the reference optical path.

S-polarized light beams 1324 and 1325 (frequencies $\omega_{21}$ and $\omega_{12}$) transmitted through the PBS 1124 are transmitted through a λ/4 plate 1163 for the two wavelengths of FND and SHG light beams, and reflected by a movable mirror 1183. The reflected light beams are transmitted through the λA/4 plate 1163 again. As a result, the polarization azimuths of the two light beams are rotated through 90°, and hence the light beams become s-polarized light beams. These light beams are reflected by the PBS 1124. The light beams 1324 and 1325 reflected by the PBS 1124 are reflected by the PBSs 1125 and 1126 to be incident on a corner cube prism 1184. The light beams 1324 and 1325 are reflected by the corner cube prism 1184 and reflected by the PBSs 1126, 1125, and 1124 again to be incident on the displacement-measurement optical path. The light beams 1324 and 1325 incident on the displacement-measurement optical path again are transmitted through the λ/4 plate 1163, and reflected by the movable mirror 1183. The reflected light beams are transmitted through the λ/4 plate 1163 again. As a result, the polarization azimuths of the light beams are rotated through 90°, and hence the light beams become p-polarized light beams, which are transmitted through the PBS 1124.

As described above, light beams passing through in the reference and displacement-measurement optical paths are transmitted through or reflected by the PBSs 1124, 1125, and 1126 several times. For this reason, even if one PBS has a low extinction ratio, since the polarization azimuths of the light beam 1326 and light beams 1327 and 1328 finally emerging from the PBS 1124 are close to those of light beams emerging from the ideal polarization beam splitter 1124, the measurement accuracy can be improved.

The respective light beams having passed through the reference and measurement optical paths twice in the above manner become almost coaxial and emerge toward the PBS 1123 (FIG. 13) (light beam 1326: frequency $\omega_{11}$; light beam 1327: frequency ($\omega_{12}$; light beam 1328: frequency $\omega_{21}$).

Figure 17:
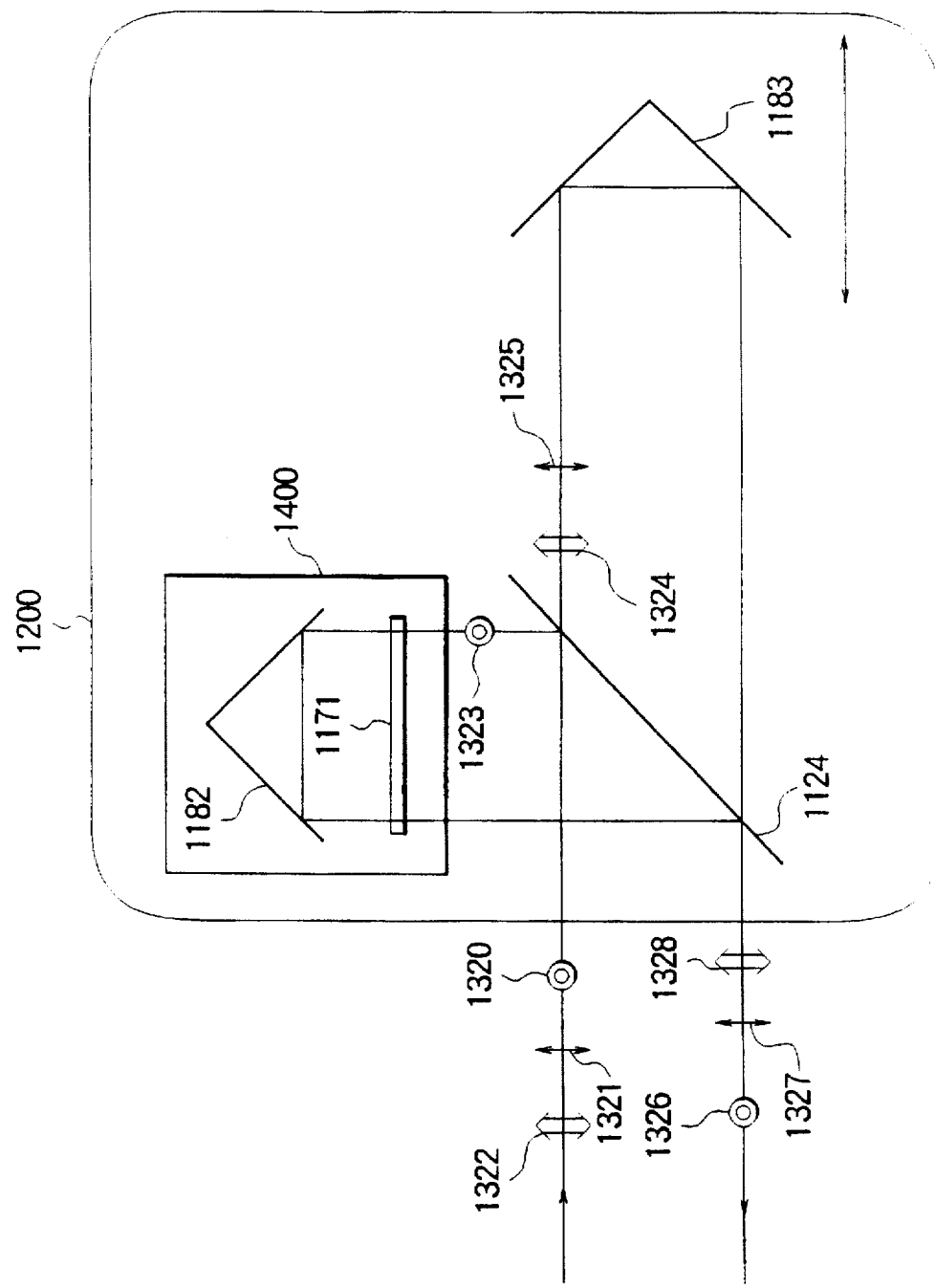
FIG. 17 is a block diagram showing the schematic arrangement of another interference section 1200 in the embodiment in FIG. 13.

The interference section 1200 is not limited to the double-path structure in which light beams pass through the reference and displacement-measurement optical paths twice, as shown in FIG. 16. For example, a single-path structure like the one shown in FIG. 17 may be used. Referring to FIG. 17, the s-polarized light beam 1320 is reflected by the PBS 1124 to be incident on the reference optical path (light beam 1323), whereas the p-polarized light beams 1321 and 1322 are transmitted through the PBS 1124 to be incident on the displacement-measurement optical path (light beams 1324 and 1325). The light beam 1323 incident on the reference optical path is transmitted through the frequency filter 1171 and reflected by the corner cubic (stationary mirror) 1182. The reflected light beam is transmitted through the frequency filter 1171 again and incident on the PBS 1124. The light beams 1324 and 1325 are reflected by the corner cube prism (movable mirror) 1183 and incident on the PBS 1124. The three light beams incident on the PBS 1124 become almost coaxial and emerge toward the PBS 1123 (FIG. 13) (light beam 1326: frequency $\omega_{11}$; light beam 1327: frequency $\omega_{12}$; light beam 1328: frequency $\omega_{21}$. When PBSs are to be arranged into a multi-stage structure like the one shown in FIG. 16, the extinction ratio can be increased by inserting PBSs in the reference and displacement-measurement optical paths, as shown in FIG. 16.

The PBS 1123 is designed to have a low extinction ratio for only p-polarized light components of FND light. The PBS 1123 transmits the s-polarized light beam 1326 and a light beam 1330 as part of the p-polarized FND light beam 1327, and causes the two transmitted light beams (light beam 1329: frequency $\omega_{11}$; light beam 1330: frequency $\omega_{12}$) to be incident on a detector 1212 with a polarizing plate. The extinction ratio of the PBS 1123 with respect to the p-polarized light components of FND light is set such that the intensity of a light beam 1332 is about 100 times that of the light beam 1330. In this case, SHG light transmitted through the PBS 1123, which causes a deterioration in the measurement accuracy for the displacement of the movable mirror 1183 using the frequency $\omega_1$, is removed or sufficiently reduced by the SHG cut filter (frequency filter) 1172. When the light beams 1329 and 1330 pass through the polarizing plate, they interfere with each other. This interference light is photoelectrically converted by the detector 1212 to be output to th e displacement-measurement detection device 1201 as a displacement-measurement signal 1402 influenced by the displacement of the movable mirror and a refractive index variation on the displacement-measurement optical path. The displacement-measurement detection device 1201 measures a phase by using the heterodyne interferometry. The displacement of an object to be measured (movable mirror 1183) can be measured by measuring the phase difference between beat frequencies of the reference signal 1401 and the displacement-measurement signal 1402. If it is difficult to design and manufacture optical thin films for the PBS 1123, a beam splitter and a PBS can be used in place of the PBS 1123. In this case, the beam splitter may be placed at the position of the PBS 1123 in FIG. 13, and the PBS may be placed on the reflection side (detector 1218 side) to cut the light beam 1326 which becomes a stray light beam.

The p-polarized FND light beam 1332 (frequency $\omega_{12}$) and an SHG light beam 1331 (frequency $\omega_{21}$), which are reflected by the PBS 1123, are partly reflected by a BS 1134. The two light beams having different frequencies and reflected by the BS 1134 are separated into a light beam 1333 (frequency $\omega_{12}$) and a light beam 1334 (frequency $\omega_{21}$) by a wavelength separation element 1143 constituted by a DM and the like. The light beams 1333 and 1334 are respectively incident on position monitors 1215 and 1216. The position monitors 1215 and 1216 measure variations in the directions of the light beams emitted from the light source, and output detection signals 1505 and 1506 to an arithmetic unit 1202.

Two light beams 1335 and 1336 having different frequencies (frequencies $\omega_{21}$ and $\omega_{12}$) and transmitted through the BS 1134 are incident on the SHG conversion element 1192. of the two light beams incident on the SHG conversion element 1192, the light beam 1336 is subjected to SHG conversion in the SHG conversion element 1192 to become an SHG light beam 1338 (frequency $\omega_{12}'=2\omega_{12}$). The SHG light beam 1338 (frequency $\omega_{12}'$) and a light beam 1337 (frequency $\omega_{21}$) interference with each other. The resultant interference light is detected by the detector 1218. Although not shown, frequency filters for cutting FND light are arranged in front of the detectors 1217 and 1218 to reduce unnecessary FND light transmitted through the SHG conversion elements 1191 and 1192.

In this embodiment, KTP is used as a material for the SHG conversion elements 1191 and 1192. Upon SHG conversion, the polarization azimuths of the light beams 1317 and 1336 are rotated. Therefore, since the polarization azimuths of the light beams 1318, 1319, 1337, and 1338 are different in this state, they do not interfere with each other. For this reason, these light beams need to interfere with each other. As a method of causing interference, for example, a method of using a polarizing plate may be used. In this method, light components having the same polarization azimuth as that of the polarizing plate interfere with each other. Alternatively, a combination of a plurality of wave plates may be used. In this method, the polarization azimuth of one light beam is matched with that of the other light beam to cause interference.

The reference signal 1407 and a measurement signal 1406 obtained in the above manner are input to the phase meter 1203. The phase meter 1203 can calculate the phase difference between the light beam having the frequency $\omega_{12}$ and the light beam having the frequency $\omega_{21}$ by measuring the phase difference between the beat frequencies of the reference signal 1407 and the measurement signal 1406. In addition, the phase meter 1203 outputs a signal 1408 corresponding to this phase different to the arithmetic unit 1202. This signal 1408 corresponds to ($D(\omega_2)-D(\omega_1)$) in equation (29). A method of correcting the influences of variations of light emitted from the light source by using the position monitors 1213, 1214, 1215, and 1216 will be described below.

Figure 19A:
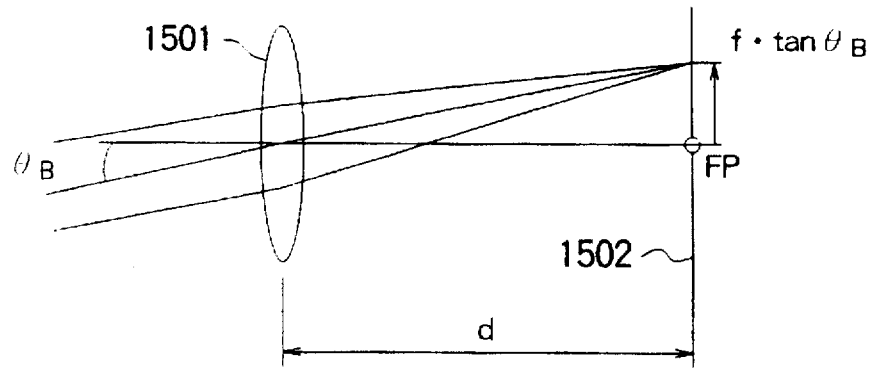
FIGS. 19A and 19B are views showing a position monitor in the embodiment in FIG. 18.
Figure 19B:
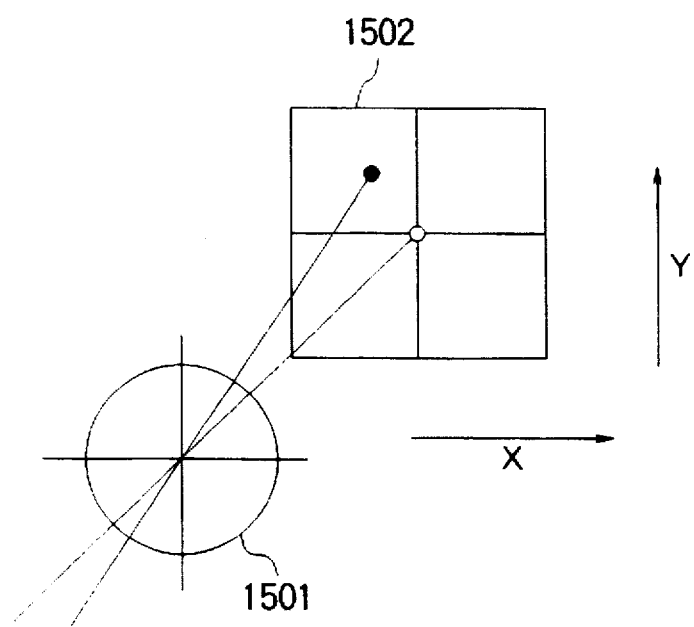

The arrangement of each position monitor will be described first. As shown in FIGS. 19A and 19B, each position monitor incorporates a lens 1501 and a photoelectric conversion element 1502. The lens 1501 and the photoelectric conversion element 1502 are arranged at a distance d from each other. The photoelectric conversion element 1502 outputs a signal representing the displacement (dtan$\theta_B$) of a beam spot from a predetermined focal point (FP). This beam spot does not move when the beam spot is translated, but moves, as shown in FIGS. 19A and 19B, when the emission angle changes by $\theta_B$. As the photoelectric conversion element 1502, any element capable of measuring x- and y-direction displacements of a beam spot can be used. For example, a high-resolution PSD (position sensitive detector), a CCD, or a four-division photodetector can be used.

Correction of variations of light will be described in detail below.

In this case, a correction operation for a measurement error contained in the signal 1408 based on a refractive index variation is performed by using detection signals 1503 and 1504 from the position monitors 1213 and 1214. Correction information used for this correction operation is calculated by regression analysis.

Figure 20A:
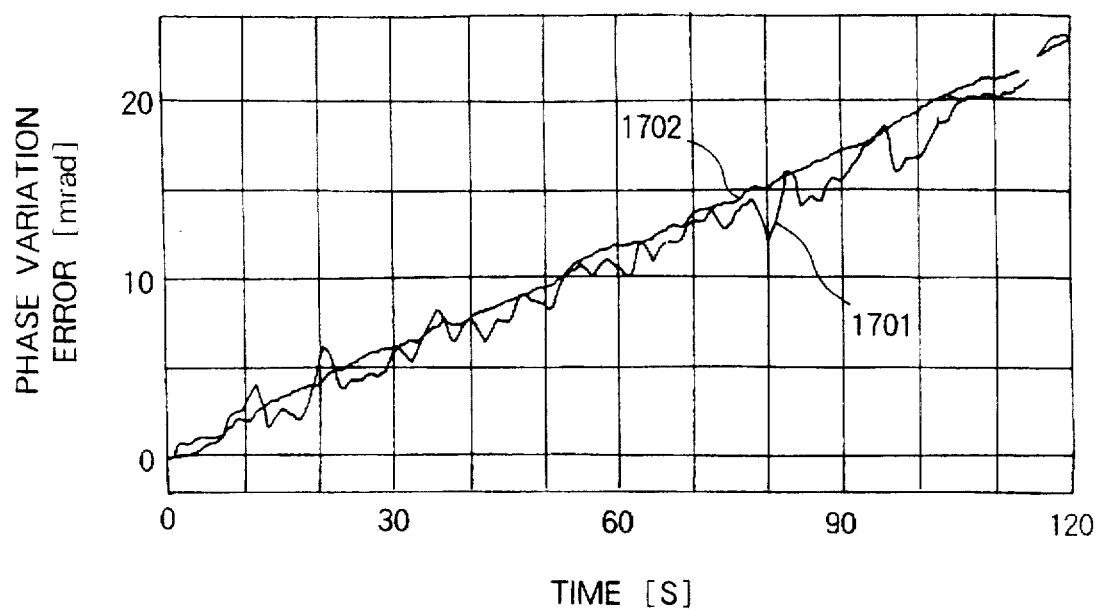
FIG. 20A is a graph showing the values measured by a phase meter 1203 and the measurement values after correction in the apparatus shown in FIG. 13.
Figure 20B:
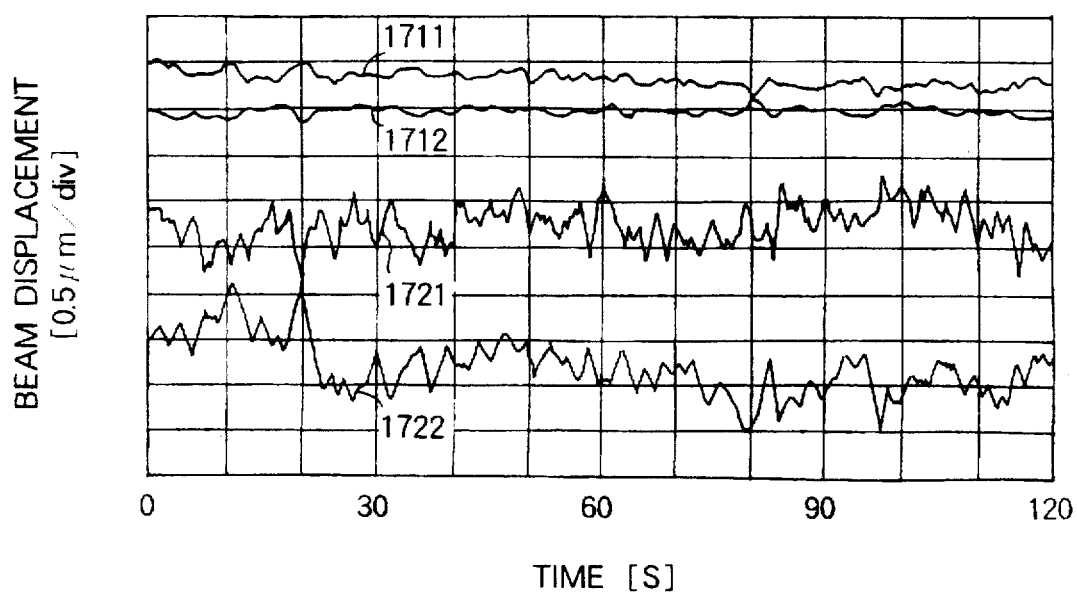
FIG. 20B is a graph showing the displacement of each light beam which is obtained by a position monitor in the apparatus in FIG. 13.

Curves 1711 and 1712 in FIG. 20B represent the x-and y-direction displacements of the beam spot which is represented by the detection signal 1503 output from the position monitor 1213, and correspond to the horizontal and vertical components (with respect to the emission angle) of the light beam having the frequency $\omega_{12}$.

Similarly, curves 1721 and 1722 in FIG. 20B represent the x- and y-direction displacements of the beam spot which is represented by the detection signal 1504 output from the position monitor 1214, and correspond to the horizontal and vertical components (with respect to the emission angle) of the light beam having the frequency $\omega_{21}$.

A curve 1701 in FIG. 20A represents the signal 1408 from the phase meter 1203 which is obtained when measurement is performed after the entire optical path is covered with a cover (not shown), in place of the air tube 1400, to minimize local refractive index variations on the entire optical path. Since the measurement time for the curve 1701 is short as shown in FIG. 20A, it is taken for granted that the refractive index of air varies in accordance with changes in temperature and atmospheric pressure which uniformly occur throughout the entire optical path. That is, this refractive index variation should be expressed by a straight line having a certain slope.

In practice, however, as indicated by the curve 1701, small variation components occur. A probable cause for such a variation component is a variation in the emission angle of a light beam emitted from the light source.

As can be given by equation (40), the curve 1701 is expressed by synthesis of constant multiples of the curves 1711, 1712, 1721, and 1722 representing the emission angle variation information of the light beam, and a straight line (kt+e) representing a constant refractive index variation.

$$\begin{aligned}\text{(curve 1701)} \;=\;& a \cdot \text{(curve 1711)} + b \cdot \text{(curve 1712)} + \\ & c \cdot \text{(curve 1721)} + d \cdot \text{(curve 1722)} + \\ & kt + e\end{aligned} \quad (40)$$

where t is the time.

Regression calculation is performed by using equation (40) to obtain optimal coefficients a, b, c, and d in advance, and the arithmetic unit 1202 performs calculation using these coefficients a, b, c, and d according to equation (41), thereby calculating a measurement value (the curve 1702 in FIG. 20A) with a measurement error caused by a variation in the emission angle of the light beam being reduced.

$$\begin{aligned}\text{(curve 1702)} \;=\;& \text{(curve 1701)} - [a \cdot \text{(curve 1711)} + \\ & b \cdot \text{(curve 1712)} + c \cdot \text{(curve 1721)} + \\ & d \cdot \text{(curve 1722)}]\end{aligned} \quad (41)$$

In this embodiment, it is assumed that actual refractive index variations are a linear change with time. When this linear change is represented by a linear approximate straight line of the curve 1701, the standard deviation of the difference between this approximate straight line and the curve 1701 is 0.85 mrad. In contrast to this, the standard deviation of the difference between the approximate straight line and the curve 1702 is 0.28 mrad. That is, the correction in this embodiment is effective.

Note that the emission angle of a light beam need not always be detected at a position immediately after the light source, but can be basically detected at any position where variations accompanying movement of the movable mirror 1183 are not easily transferred. For example, the emission angle may be detected at the positions of the position monitors 1215 and 1216. If pieces of information of the emission angle of a light beam are obtained at these positions, variations in the angles of two light beams which occur while the two light beams having different frequencies pass through the optical paths can be corrected. Furthermore, the emission angle of a light beam need not always be performed by using an output from one position. As shown in FIG. 13, for example, position monitors may be placed in a plurality of places, and outputs from the plurality of places may be used for correction.

In the above manner, the arithmetic unit 1202 performs arithmetic processing and correction for a measurement value (displacement signal 1404) from the displacement-measurement detection device 1201 by using a measurement value (signal 1408) from the phase meter 1203 and the values of the emission angles of light beams (detection angles 1503, 1504, 1505, and 1506) from the position monitors 1213, 1214, 1215, and 1216, thereby obtaining the geometric displacement of the movable mirror 1183 with a high precision.

Detection of a refractive index variation using the above two frequencies is preferably performed with respect to only the displacement-measurement optical path. However, in FIG. 13, if two light beams having different frequencies undergo refractive index variations on the optical paths between the light source and the PBS 1124 and between the PBS 1124 and the detector 1218, these refractive index variations are also detected. Therefore, the optical paths other than the displacement-measurement optical path are preferably covered with air tubes or the like to minimize the influences of unnecessary refractive index variations which occur in places other than the displacement-measurement optical path. In addition, each air tube may be evacuated to reduce refractive index variations therein so as to further improve the measurement accuracy.

In this embodiment, of the two light beams having the different frequencies (FND and SHG light beams), the FND light beam is used to measure the displacement ($D(\omega_1)$) of the movable mirror 1183. Theoretically, the functions of the FND and SHG light beams may be reversed to use the SHG light beam for measurement of the displacement of the movable mirror 1183. However, the FND light beam is preferably used to measure the displacement of the movable mirror 1183 because a measurement error caused upon a refractive index variation and finally measured by the detector is smaller. If, for example, the FND light beam is used, the light beams 1321 and 1322 incident on the PBS 1124 finally reach the detector 1218. As described above, however, since the extinction ratio of the PBS 1124 is not ideal, these light beams are also incident on the reference optical path. In this case, although the intensity of the SHG light beam can be sufficiently decreased by the frequency filters 1171 and 1172, the intensity of the FND light beam may not be sufficiently decreased depending on the extinction ratios of the PBSs 1124 and 1125. When the FND light beam, which is an error factor, is SHG-converted by the SHG conversion element 1192, the intensity of the light beam is sufficiently decreased. For this reason, this light beam exerts no serious influence on the precision of refractive index variation measurement. This is because the intensity of the SHG light beam obtained by the SHG conversion element is proportional to the square of the intensity of the FND light beam incident on the SHG conversion element, and the conversion efficiency is as low as about 1%. When the SHG light beam is used to measure the displacement of the movable mirror 1183, the intensity of only the FND light beam of the two light beams incident on the reference optical path can be decreased because of the above problem associated with the extinction ratio of the PBS 1124. If, therefore, the intensity of the SHG light beam, which is an error factor, is not sufficiently decreased by the PBSs 1124 and 1125, when the SHG light beam passes through the SHG conversion element 1192, the light beam does not undergo SHG conversion unlike the above FND light beam, and is transmitted through the SHG conversion element 1192. For this reason, the SHG light beam may adversely affect the precision of refractive index variation measurement.

$D(\omega_1)$ and $(D(\omega_2)-D(\omega_1))$ in equation (39) correspond to the signals output from the phase meters 1201 and 1203. However, $D(\omega_1)$ obtained by the phase meter 1201 and $D(\omega_1)$ obtained by the phase meter 1203 are measured by different methods (the signal from the phase meter 1203 contains no information about the reference optical path). As described above, however, the reference optical path is covered with the air tube 1400, and a refractive index variation on the reference optical path can be neglected by, for example, shortening the reference optical path. For this reason, by measuring the phase difference between two light beams on the displacement-measurement optical path, $(D(\omega_2)-D(\omega_1))$ can be obtained.

As described above, in this embodiment, since only one light source is required, a reduction in cost can be attained as compared with the apparatus shown in FIG. 21. In addition, since the space for another light source can be omitted, a compact optical interference measuring apparatus can be realized. Furthermore, since only two light beams having different frequencies are used, it suffices to use elements adapted to the two light beams having the different frequencies as a wavelength coupling element and other optical elements used for an interferometer. This allows simplification of the design of optical systems and optical elements.

In this embodiment, the split ratio of light split by the PBSs 1121, 1123, and 1133, the BS 1131, and the PBSs 1132, 1133, and 1134 is set in the above-described manner. This split ratio, however, is preferably determined in consideration of the intensities of the FND and SHG light beams from the light source 1101, the conversion efficiencies of the SHG conversion elements 1191 and 1192, the photodetection sensitivities of the detectors 1211, 1212, 1217, and 1218 and the like, the optical loss in each optical element, and the like. Since the conversion efficiencies of the SHG conversion elements 1191 and 1192 are less than 1%, it is preferable that the intensities of light beams incident on the detectors 1211 and 1212 be minimized, and the remaining light components be used to measure a refractive index variation. In addition, the apparatus is preferably designed such that p- and s-polarized light beams incident on the detectors 1211 and 1212 have almost the same intensity.

Figure 18:
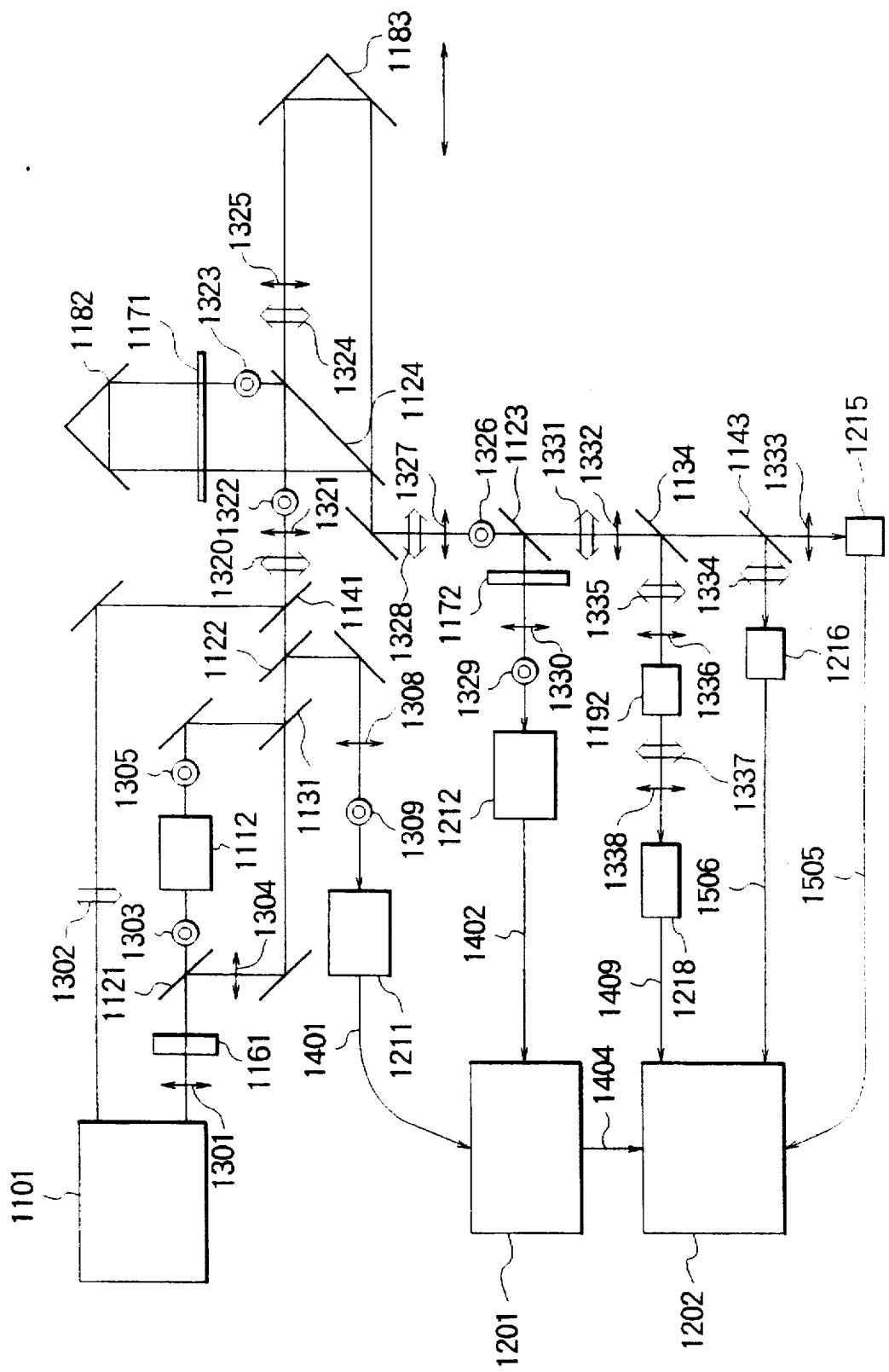
FIG. 18 is a block diagram showing the schematic arrangement of an optical interference measuring apparatus according to still another embodiment of the present invention.

FIG. 18 shows the schematic arrangement of an optical interference measuring apparatus according to still another embodiment of the present invention.

The basic arrangement of the apparatus in FIG. 18 is the same as that of the apparatus of each previous embodiment except that $(D(\omega_2)-D(\omega_1))$ in equation (39) is measured by the homodyne interferometry. For this reason, the same reference numerals in this embodiment denote the same parts as in each previous embodiment, and a description thereof will be omitted.

A light source 1101 emits an FND light beam 1301 and an SHG light beam 1302. The light beam 1301 is split into a light beam 1303 and a light beam 1304 by a λ/2 plate 1161 and a PBS 1121, as in the case in FIG. 14. The light beam 1303 is frequency-modulated by a frequency shifter 1112 to become a light beam 1305, as in the case in FIG. 14. The light beam 1304 emerges from a BS 1131 coaxially with the light beam 1305 without undergoing frequency modulation. Thereafter, some light components (light beams 1308 and 1309) of the light beams 1304 and 1305 are reflected by a PBS 1122. The light beams 1308 and 1309 reflected by the PBS 1122 pass through a polarizing plate (not shown) to interfere with each other. The resultant interference light is detected by a detector 1211 and output as a reference signal 1401 to a phase meter 1201, as in the case of the apparatus shown in FIG. 13. Meanwhile, the two light beams transmitted through the PBS 1122 are coupled to the light beam 1302 by a wavelength coupling element 1141, and the three light beams emerge coaxially (light beams 1320, 1321, and 1322). The three light beams incident on a PBS 1124 are split into light beams to propagate in the reference and displacement-measurement optical paths, in the same manner as in the interference section 1200 in FIG. 17 in the previous embodiment. Thereafter, the light beams emerge from the PBS 1124 coaxially (light beams 1326, 1327, and 1328). Of the light beams 1326, 1327, and 1328, the light beams 1326 and 1327 are partly reflected by a PBS 1123, and the reflected light beams are transmitted through a frequency filter 1172, as in the case in FIG. 13. Light beams 1329 and 1330 transmitted through the frequency filter 1172 are transmitted through a polarizing plate (not shown) to interfere with each other. The resultant interference light is detected by the detector 1212. The interference light detected by the detector 1212 is output as a displacement-measurement signal 1402 to the phase meter 1201. The phase meter 1201 measures the displacement of a movable mirror 1183 on the basis of the reference signal 1401 and the displacement-measurement signal 1402 by using the heterodyne interferometry, and outputs a displacement signal 1404 to the arithmetic unit 1202, as in the case in FIG. 13.

Two light beams 1331 and 1332 transmitted through the PBS 1123 are partly reflected by a BS 1134. Of the two light beams reflected by the BS 1134, an FND light beam 1336 is converted into an SHG light beam (light beam 1338) by an SHG conversion element 1192. This SHG light beam then interferes with an SHG light beam 1337 transmitted through the SHG conversion element. The resultant interference light is detected by a detector 1218 and output as a fluctuation measurement signal 1409 to the arithmetic unit 1202. The two light beams transmitted through the BS 1134 are separated into light beams 1333 and 1334 having different frequencies by a wavelength separation element 1143. The light beams 1333 and 1334 are respectively incident on position monitors 1215 and 1216, in which a variation in the emission direction of each light beam is detected, as in the apparatus shown in FIG. 13. The position monitors 1215 and 1216 output pieces of information of the light beams 1333 and 1334 as detection signals 1505 and 1506 to the arithmetic unit 1202. The arithmetic unit 1202 calculates a true displacement D of the movable mirror 1183 from the displacement signal 1404 output from the phase meter 1202, the fluctuation measurement signal 1409 output from the detector 1218, and the detection signals 1505 and 1506 output from the position monitors 1215 and 1216 in the same manner as in the apparatus in FIG. 1.

Although a refractive index variation amount can be obtained from only the fluctuation measurement signal 1409 output from the detector 1218, the direction of the variation cannot be discriminated. In other words, the absolute value of $(D(\omega_2)-D(\omega_1))$ in equation (29) can be obtained, but whether $D(\omega_2)$ is larger than $D(\omega_1)$ cannot be discriminated. In order to discriminate the direction of a variation, a signal 90° out of phase from the signal 1402 must be obtained. According to a known method of obtaining such a signal, for example, incident interference light is intensity-split into two interference light beams in the detector 1218. With respect to one of the split interference light beams, the other interference light beam is detected with a phase shift of 90°, and the direction of the variation is discriminated from two signals obtained from the two interference light beams. Note that a wave plate, a polarizing element, or the like is used to shift the phase of one interference light beam from that of the other interference light beam by 9°. Alternatively, two signals having a phase difference of 90° can be obtained by modulating the optical path length of one of two light beams having different frequencies, which are incident on the wavelength conversion element 1192, with a given frequency f, and performing synchronous detection in the arithmetic unit 1202 on the basis of the frequency f. In this method, the direction of a variation can be discriminated in the same manner as described above.

The apparatus in FIG. 18 preferably detects a refractive index variation on only the displacement-measurement optical path, similar to the apparatus in FIG. 13. For this reason, the optical paths other than the displacement-measurement optical path are preferably covered with air tubes or the like. Of the three light beams incident on the PBS 1124, the light beams 1320 and 1321 are partly extracted, and the light beam 1321 is caused to undergo SHG conversion to interfere with the light beam 1320. The resultant interference light is preferably used as a reference signal for the refractive index variation. By obtaining this reference signal, the information of the refractive index variation before incidence of the light beams on the PBS 1124 can be obtained. Since the refractive index variation before incidence of the light beams on the PBS 1124 can be removed from the measurement value of the fluctuation measurement signal 1409 detected by the detector 1218 by using this information, the refractive index variation on the displacement-measurement optical path can be detected more accurately.

As described above, since this apparatus also measures the displacement of an object to be measured by using light for measurement of a refractive index variation, the design of optical systems and optical elements adapted for three wavelengths can be simplified.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 217860/1995 filed on Aug. 25, 1995 and 215579/1995 filed on Aug. 24, 1995 are hereby incorporated by reference.

What is claimed is:

1. An apparatus for measuring displacement of an object, comprising:

at least one light source disposed to emit light beams having frequencies $f_1$, $f_2$, $f_3$ and $f_3'$, the light beams having frequencies $f_3$ and $f_3'$ having a different polarization direction;

a polarization beam splitter disposed in a pathway of the light beams having frequencies $f_1$, $f_2$, $f_3$ and $f_3'$;

a moving mirror fixed on the object, the moving mirror being irradiated with the light beams having frequencies $f_1$, $f_2$, and $f_3$;

a fixed mirror disposed to be irradiated with the light beams having frequencies $f_1$, $f_2$ and $f_3'$;

a plurality of photoelectric conversion elements on which light beams reflected from the fixed and moving mirrors are incident; and a processing device connected to the photoelectric conversion elements, the processing device configured to calculate a displacement of the object based on data received from the photoelectric conversion elements.

2. An apparatus according to claim 1, wherein a number corresponding to the plurality of photoelectric conversion elements is three, wherein the first photoelectric conversion element is arranged to receive interference light from light beams reflected by the moving mirror and, when emitted by the light source having frequencies $f_1$ and $f_2$, wherein the second photoelectric conversion element is arranged to receive interference light from light beams reflected by the fixed mirror and, when emitted by the light source having frequencies $f_1$ and $f_2$, and wherein the third photoelectric conversion element is arranged to receive interference light from light beams reflected by the moving and fixed mirrors and, when emitted by the light source having frequencies $f_3$ and $f_3'$.

3. An apparatus according to claim 2, wherein the processing device calculates the displacement $\Delta D(tn)$ by using values $\Delta D(f_3,tn)$, A, and $\Delta X(t_w)$, where, $\Delta D(f_3,tn)$ is a calculated displacement determined by using the data output from the third photoelectric conversion element, A is a constant, and $\Delta X(t_w)$ is a displacement difference calculated by using the data output from the first and second photoelectric conversion elements.

4. An apparatus according to claim 3, wherein the processing device calculates the displacement $\Delta D(tn)$ by using the following equation:

$$\Delta D(tn)=\Delta D(f_3,tn)-\Delta X(t_w).$$

5. An apparatus according to claim 3 wherein the processing device calculates the displacement $\Delta D(tn)$ by using values $\Delta D(f_3,tn)$, A, $\Delta X(t_w)$, and $\Delta M(t_w)$ where, $\Delta M(t_w)$ is determined by averaging a plurality of values of $\Delta D(f_3,tn)$ multiplied by predetermined weighting functions.

6. An apparatus according to claim 5, wherein the processing device calculates the displacement $\Delta D(tn)$ by using the following equation:

$$\Delta D(tn) \Delta D(f_3,tn)-(1-A \cdot \Delta X(t_w)/\Delta M(t_w)).$$

7. An apparatus for measuring displacement of an object according to claim 1, wherein the fixed mirror is configured as a corner cube prism, and wherein the moving mirror is also configured as a corner cube prism.

8. An apparatus for measuring displacement of an object, comprising:

at least one light source disposed to emit light beams having frequencies $f_1$, $f_2$ and $f_2'$, the light beams having frequencies $f_2$ and $f_2'$ having a different polarization direction;

a polarization beam splitter disposed in a pathway of the light beams having frequencies $f_1$, $f_2$ and $f_2'$;

a moving mirror fixed on the object, the moving mirror being irradiated with the light beams having frequencies $f_1$ and $f_2$;

a fixed mirror disposed to be irradiated with the light beams having frequencies $f_2'$;

a plurality of photoelectric conversion elements on which light beams reflected from the fixed and moving mirrors are incident; and a processing device connected to the photoelectric conversion elements, the processing device configured to calculate a displacement of the object based on data received from the photoelectric conversion elements, wherein a number corresponding to the plurality of photoelectric conversion elements is three, wherein the first photoelectric conversion element is arranged to receive interference light from light beams reflected by the moving mirror and, when emitted by the light source having frequencies $f_1$, and $f_2$, wherein the second photoelectric conversion element is arranged to receive interference light from light beams reflected by the fixed mirror and, when emitted by the light source having frequencies $f_1$, and $f_2$, and wherein the first photoelectric conversion element is arranged to receive interference light from light beams reflected by the moving and fixed mirrors and, when emitted by the light source having frequencies $f_2$ and $f_2'$.

9. An apparatus according to claim 8, wherein the processing device calculates the displacement $\Delta D(tn)$ by using values $\Delta D(f_2, tn)$, A, and $\Delta X(t_w)$, where, $\Delta D(f_2, tn)$ is a calculated displacement that is determined by using the data output from the third photoelectric conversion element, A is a constant, and $\Delta X(t_w)$ is a displacement difference calculated by using the data output from the first and second, photoelectric conversion elements.

10. An apparatus according to claim 9, wherein the processing device calculates the displacement $\Delta D(tn)$ by using the following equation:

$$\Delta D(tn) = \Delta D(f_2, tn) - A \cdot \Delta X(t_w).$$

11. An apparatus according to claim 9, wherein the processing device calculates the displacement $\Delta D(tn)$ by using-values $\Delta D(f_2, tn)$, A, $\Delta X(t_w)$, and $\Delta M(t_w)$ where, $\Delta M(t_w)$ is determined by averaging a plurality of values of $\Delta D(f_2, tn)$ multiplied by predetermined weighting functions.

12. An apparatus according to claim 11, wherein the processing device calculates the displacement $\Delta D(tn)$ by using the following equation:

$$\Delta D(tn) = D(f_2, tn) - (1 - A \cdot \Delta X(t_w) / \Delta M(t_w)).$$

13. An apparatus for measuring displacement of an object according to claim 8, wherein the fixed mirror is, configured as a corner cube prism, and wherein the moving mirror is also configured as a corner cube prism.

* * * * *

UNITED STATES PATENT AND TRADEMARK OFFICE
CERTIFICATE OF CORRECTION

PATENT NO. : 5,757,489
DATED : May 26, 1998
INVENTOR(S) : Jun Kawakami, et. al.

It is certified that error appears in the above-identified patent and that said Letters Patent is hereby corrected as shown below:

Title page, item [75], after Japan, insert --Keishin Shinjo, Kawasaki-shi, Japan--.

Column 34, line 55, delete "-" and insert --.--. (first occurrence).
Column 35, line 26, delete in its entirety.
Column 35, line 27, delete "the light source having" and insert --which had-; after "f2" but before ";" insert --when emitted by said light source--.
Column 35, line 32, delete "first" and isnert --third--.
Column 36, line 26, delete "-" and insert -- . --. (first occurrence).

Signed and Sealed this

Seventeenth Day of November, 1998

Attest:

BRUCE LEHMAN

*Attesting Officer*   *Commissioner of Patents and Trademarks*